United States Patent [19]

Cho et al.

[11] Patent Number: 5,123,060
[45] Date of Patent: Jun. 16, 1992

[54] METHOD OF GENERATING GRADATION CORRECTION CURVE FOR CORRECTING GRADATION CHARACTER OF IMAGE

[75] Inventors: Masamichi Cho; Yasuo Kurusu; Akihiro Nomura; Kunio Tomohisa; Takashi Sakamoto, all of Kyoto; Nobuhiro Takita, Osaka, all of Japan

[73] Assignee: Dainippon Screen Mfg. Co., Ltd., Japan

[21] Appl. No.: 764,042

[22] Filed: Sep. 20, 1991

Related U.S. Application Data

[63] Continuation of Ser. No. 373,090, Jun. 28, 1989, abandoned.

[30] Foreign Application Priority Data

Jun. 30, 1988 [JP] Japan .................. 63-165364
Jun. 30, 1988 [JP] Japan .................. 63-165365
Jun. 30, 1988 [JP] Japan .................. 63-165366
Aug. 22, 1988 [JP] Japan .................. 63-208820

[51] Int. Cl.⁵ .............................. G06K 9/38
[52] U.S. Cl. ............................ 382/51; 382/50; 358/456; 358/458

[58] Field of Search .............. 382/50, 51; 358/80, 358/456, 458

[56] References Cited

U.S. PATENT DOCUMENTS 4,472,736  9/1984  Ushio et al. .................. 358/75
4,791,678  12/1988  Iwase et al. .................. 382/54
4,792,979  12/1988  Nomura et al. .................. 382/54

*Primary Examiner*—Leo H. Boudreau
*Assistant Examiner*—Barry Stellrecht
*Attorney, Agent, or Firm*—Ostrolenk, Faber, Gerb & Soffen

[57] ABSTRACT

Experiential gradation correction curves for sample images are prepared. By analyzing the experiential gradation correction curves and accumulated density histograms of the sample images, two points $(Y_1, Q_1)$ and $(Y_2, Q_2)$ are specified, where $Y_1$ and $Y_2$ are values of accumulated occurrence and $Q_1$ and $Q_2$ are halftone dot percentages for image reproduction. The values $Y_1$ and $Y_2$ through an accumulated density histogram of an original image whose gradation is to be corrected. A gradation correction curve $Q = G(x)$ is determined so as to pass through the two points $(x_1, Q_1)$ and $(x_2, Q_2)$.

28 Claims, 22 Drawing Sheets

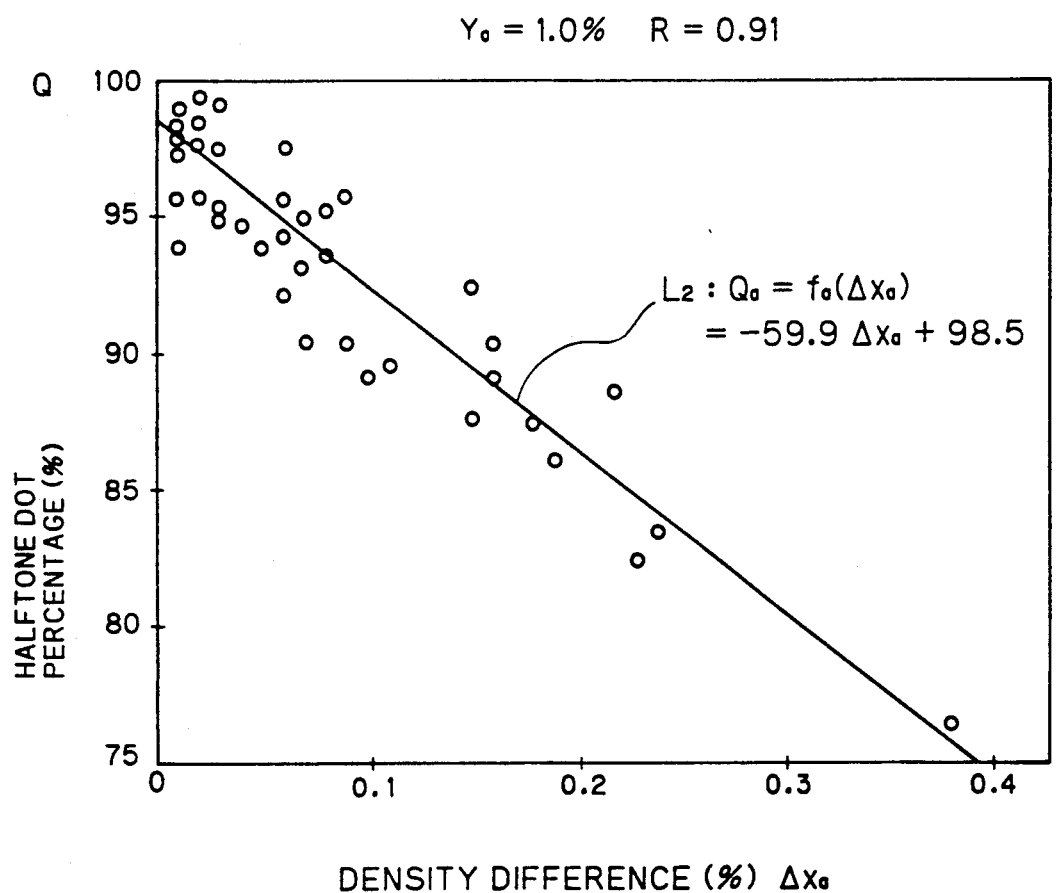

METHOD OF GENERATING GRADATION CORRECTION CURVE FOR CORRECTING GRADATION CHARACTER OF IMAGE

This is a continuation of Application Ser. No. 07/373,090 filed Jun. 28, 1989, now abandoned.

BACKGROUND OF THE INVENTION

1. Field of the Invention

The present invention relates to a method of generating a gradation correction curve which is employed for correcting the gradation character of a given image.

2. Description of Prior Arts

As well known in the art, an image having gradation is read with a photoelectric image reader in order to reproduce the image on a photosensitive film or another medium. The image data which is obtained through image reading is often subjected to a gradation correction so that the gradation character of the image is corrected into desirable one. The gradation correction is carried out through a gradation correction curve which is determined in the basis of density distribution on the image and other characters. The determination of the gradation correction curve has been attained by a skillful operator since the determination is a sensitive work. Therefore, expected is development of an apparatus operable to automatically generate a gradation correction curve.

In order to develop such an automatic apparatus, it is required to establish a method of generating gradation correction curves which is suitable for automatic generation of the gradation correction curves. In particular, the following three problems should be solved:

(1) How highlight and shadow points are determined in the automatic generation of the gradation correction curves?

(2) How the density range of an original image is reflected into the gradation correction?

(3) How the sensitive character around highlight and shadow points are provided in gradation correction curves?

U.S. Pat. No. 4,792,979 which has been assigned to the applicant of the present invention answers the above-indicated problems to some extent. However, more effective are required to fully solve the problems.

SUMMARY OF THE INVENTION

The present invention is directed to a method of generating a gradation correction curve $Q=G(x)$ used for gradation correction of an original image, where x is a first variable representing optical densities and Q is a second variable representing corrected optical densities or halftone dot percentages corresponding to the corrected optical densities.

According to the present invention, the method comprises the steps of: (a) preparing a plurality of sample images, (b) obtaining a plurality of Y-Q curves through which opitcal densities corresponding to Y-values are converted into Q-values in experiential gradation correction rules applied to the plurality of sample images, respectively, where Y is a third variable representing accumulated occurence of optical densities, (c) finding coordinate values $(Y_r, Q_r)$ representing a region on a Y-Q plane at which the plurality of Y-Q curves concentrate, (d) defining a reference Y-value and a reference Q-value by components $Y_r$ and $Q_r$ in the coordinate values $(Y_r, Q_r)$, respectively, (e) obtaining an accumulated histogram $Y=h(x)$ of optical densities with respect to the original image, (f) converting the reference Y-value $Y_r$ into a reference x-value $x_r$ through a curve expressing the accumulated histogram $Y=h(x)$, and (g) generating the gradation curve $Q=G(x)$ so that the gradation curve $Q=G(x)$ passes through a point having coordinate values $(x_r, Q_r)$ on an x-Q plane.

Preferably, the step (b) includes the steps of: (b-1) obtaining a plurality of experiential x-Q curves for the plurality of sample images, respectively, (b-2) obtaining a plurality of accumulated histograms representing relations between the variables x and Y in the plurality of sample images, respectively, and (b-3 combining the plurality of experiential x-Q curves with curves expressing the plurality of accumulated histograms to obtain the plurality of Y-Q curves, respectively.

In an aspect of the present invention, the method may be constructed so as to comprise the steps of: (a) obtaining an accumulated histogram $Y=h(x)$ of optical densities on the original image, where Y is a third variable representing accumulated occurence of optical densities, (b) finding a critical x-value $x_m$ at which the accumulated histogram $Y=h(x)$ reaches a limit value of the third variable Y, (c) converting a given reference Y-value $Y_0$ to a reference x-value $x_0$ through a curve expressing the accumulated histogram $Y=h(x)$, (d) finding a degree of inclination of the curve expressing the accumulated histogram $Y=h(x)$ in a section between the critical x-value $x_m$ and the reference x-value $x_0$, to obtain a quantity expressing the degree of inclination, (e) converting the quantity to a Q-value according to a predetermined conversion rule, to thereby obtain a reference Q-value $Q_0$, and (f) generating the gradation curve $Q=G(x)$ so that the gradation curve $Q=G(x)$ passes through a point having coordinate values $(x_0, Q_0)$ on an x-Q plane.

In another aspect of the present invention, the method comprises the steps of: (a) detecting a density distribution on the original image to obtain a value $\Delta x$ representing a density range of the original image, (b) generating model curve $Q=K(x)$ on an x-Q plane by determining a curvature of the model curve $Q=K(x)$ according to the value $\Delta x$, wherein a sign of the curvature Of the model curve is variable depending on the density range of the original image, and (c) correcting the model curve $Q=K(x)$ so as to pass through at least one point which is given on the x-Q plane, to generate the gradation correction curve $Q=G(x)$.

The present invention provides further another method comprising the steps of: (a) generating a first gradation curve $Q=F(x)$ passing through designated highlight and shadow points on an x-Q plane which is oriented so that an x-axis is a horizontal axis and a Q-axis is a vertical axis being directed upward, (b) designating a saturation critical density range CR of the first variable x which includes a saturation critical density value $x_C$ at which the first gradation correction $Q=F(x)$ reaches a saturation value of the second variable Q, and (c) generating a correction curve $Q=G_C(x)$ satisfying all of the following conditions i through iii):

(i) the correction curve $Q=G_C(x)$ is defined in the saturation critical density range CR, (ii) the correction curve $Q=G_C(x)$ changes more gradually than the first gradation correction curve $Q=F(x)$ in the saturation critical density range CR, (iii) the correction curve $Q=G_C(x)$ is smoothly connectable to the first gradation correction curve $Q=F(x)$ at a terminal point of the saturation critical density range CR.

In the next step (d), a part of the first gradation correction curve $Q=F(x)$ located in the saturation critical density range CR is replaced by the correction curve $Q=G_C(x)$ in order to correct the first gradation correction curve $Q=F(x)$, whereby a second gradation correction curve serving as the gradation correction curve $Q=G(x)$ is generated.

Although various mathematical symbols appearing in the summary of the invention and appended claims have correspondence to those in the preferred embodiment, it is to be noted that the correspondence should not be interpreted as limitation of the present invention to the embodied ones. A part of the symbols in the summary and the appended claims is somewhat different from those in the preferred embodiments so as to avoid confusion between general concept of the present invention and the embodied ones.

Furthermore, the term "optical density" is used in its broad sense in the present invention, and therefore, it may be a signal level which is obtained by photoelectrically reading an image, a Munsell value, or other quantities representing the optical density.

Accordingly, an object of the present invention is to provide a method of generating a gradation correction curve which is suitable for automatic generation of the gradation correction curve.

Another object is to systematically determine highlight and/or shadow points.

Another object is to reflect the density range of an original image to gradation correction.

Further another object it to provide a sensitive character around highlight and/or shadow point to a gradation correction curve These and other objects, features, aspects and advantages of the present invention will become more apparent from the following detailed description of the present invention when taken in conjunction with the accompanying drawings.

BRIEF DESCRIPTION OF THE DRAWINGS

FIG. 7B is a diagram showing another approximate function.

DESCRIPTION OF THE PREFERRED EMBODIMENTS

A. Entire Structure

Figure 1:
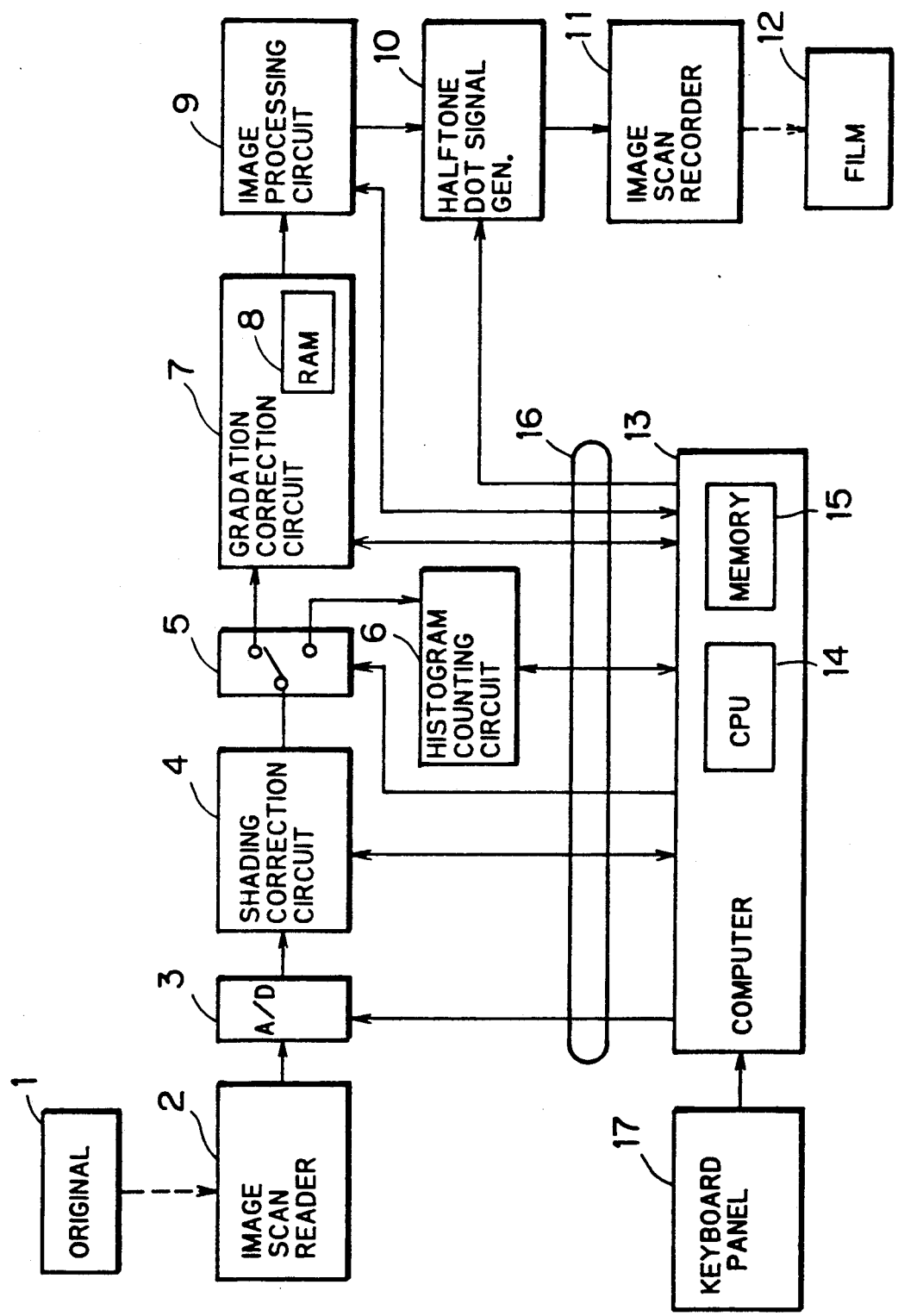
FIG. 1 is a schematic block diagram showing a process scanner according to an embodiment of the present invention.

FIG. 1 is a schematic block diagram showing a process scanner having a gradation correction apparatus according to a preferred embodiment of the present invention. In this scanner, an image scan reader 2 reads the image of an original 1 having gradation for each pixel, and an A-D converter 3 converts image data thus obtained into digital image data. The digital image data are shading-corrected in a shading correction circuit 4, and supplied to a selector 5.

The selector 5 selects a histogram counting circuit 6 in a setup step as hereinafter described, while the same selects a gradation correction circuit 7 in actual operation. The gradation correction circuit 7 has a RAM 8, and performs gradation correction on inputted image data on the basis of a gradation correction table provided in the RAM 8. After the gradation correction, the image data are subjected to processing such as unsharp masking, magnification correction etc. and thereafter supplied to a halftone dot signal generator 10.

The halftone dot signal generator 10 converts the inputted image da&a into a halftone dot signal, and outputs the same to an image scan recorder 11. The image scan recorder 11 records a halftone dot image exposing on a film 12 on the basis of the halftone dot signal.

The respective circuits are operated under control by a computer 13. The computer 13 has a CPU 14 and a memory 15, and performs various data processing as hereinafter described. Signals (data) are transfered between the respective circuits and the computer 13 through a signal line group 6. A keyboard panel 7 is adapted to input commands to the computer 13.

B. First Method

First, description is made on a first method of setting highlight and shadow points on the basis of a plurality of previously prepared sample picture data.

Figure 2:
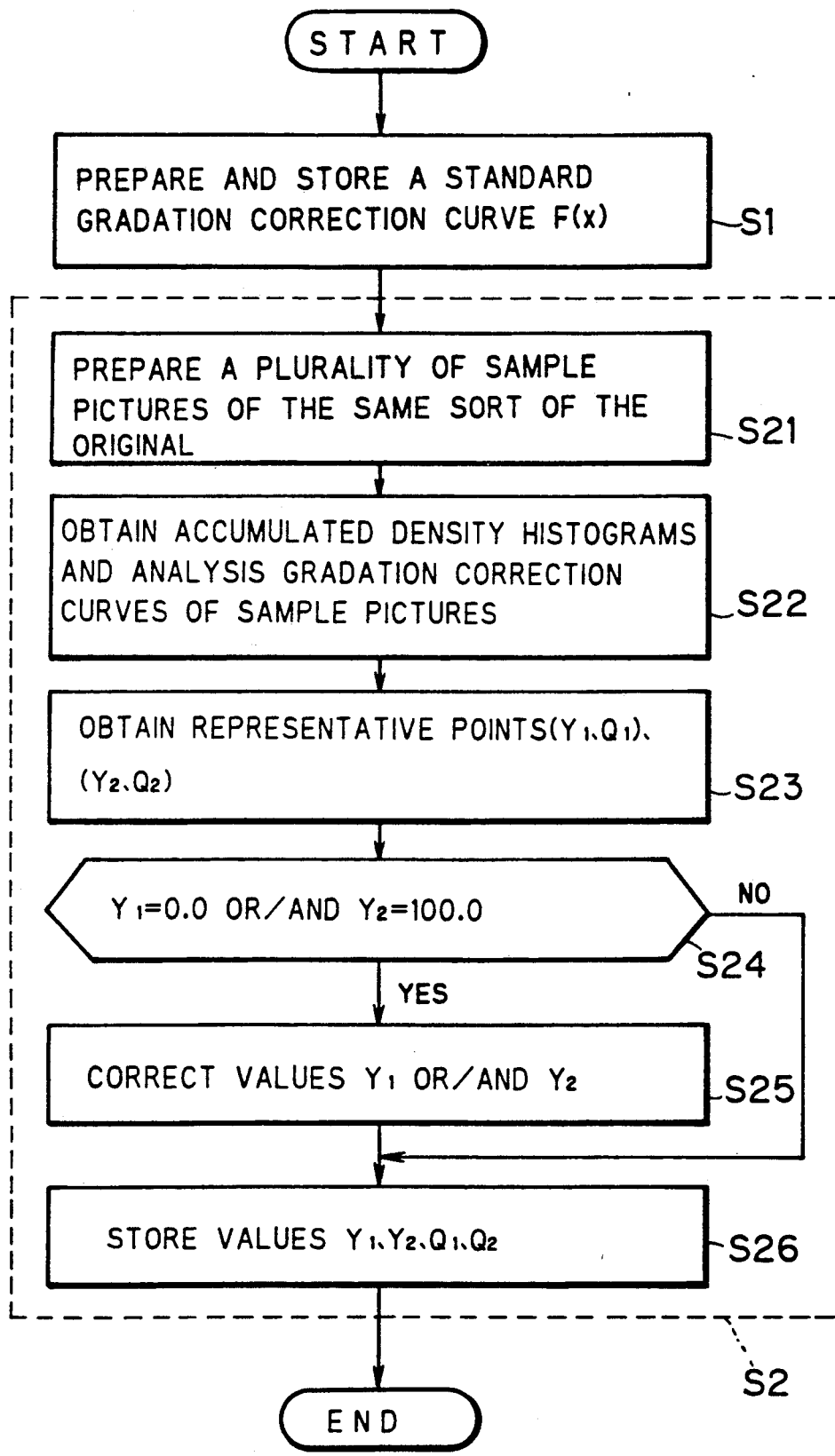
FIG. 2 is a flow chart showing preparation steps for the first method according to an embodiment of the present invention.

FIG. 2 is a flow chart showing preparation steps for the first method. In preparation for the setup operation in the gradation correction circuit 7, an empirically used standard gradation correction curve F(x) (refer to FIG. 5C described below), which is the function of a density value x, is prepared at a step S1 in FIG. 2, and data expressing the same is stored in the memory 15.

In a subsequent step group S2, parameter values for automatic setup operation are decided as follows (the step S1 and the step group S2 may be reversed in order): First, the type of an original is specified in relation to application thereof ("monochrome for commercial printing", for example) at a step S21. A plurality of sample pictures belonging to this type are prepared desirably in a large number of 50 to 100, for example.

At a step S22, accumulated density histograms of images are obtained with respect to the sample pictures and gradation correction curves empirically obtained with respect to the sample pictures are statistically analyzed. Since relation between the density value x and accumulated density histogram values rates of accumulated occurrence) is recognized through the obtained accumulated density histograms and relation between the density value x and halftone area rates is recognized through the analyzed gradation correction curves, curves empirically used in the sample pictures, showing relation between the rates of accumulated occurrence and the values of the halftone area rates, can be obtained by combining the same.

Figure 3A:
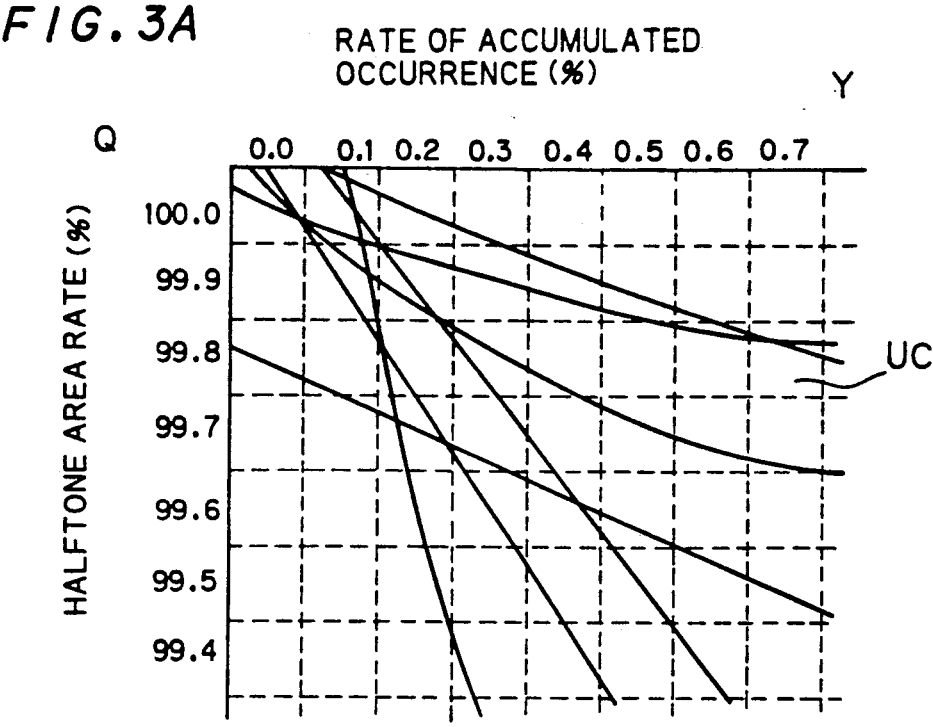
FIG. 3A is a diagram showing highlight portions of a plurality of empirical curves.

FIG. 3A shows highlight portions of a plurality of empirical curves thus obtained, with reference to negative recording. The horizontal axis in FIG. 3A represents the rates Y of accumulated occurrence, and the vertical axis represents the halftone area rates Q. These axes are graduated in tenths of 1, thereby to assume a matrix of unit cells UC.

Figure 3B:
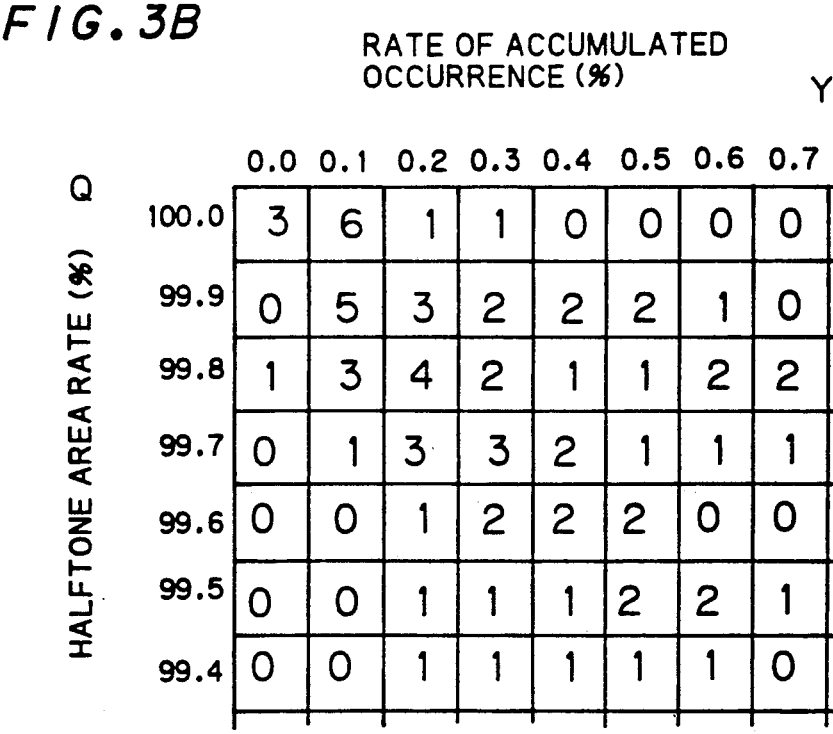
FIG. 3B is a diagram showing counted numbers of empirical curves shown in FIG. 3A.

FIG. 3B shows counted numbers of empirical curves passing through the respective unit cells UC shown in FIG. 3A. As understood from FIG. 3B, the maximum number of, i.e., six empirical curves pass through a unit cell UC which has a rate Y of accumulated occurrence of 0.1% and a halftone area rate Q of 100.0%. That is, a point having two-dimensional coordinates (0.1, 100.0) in FIG. 3A is the most frequently used point. Further, the most frequently used point in a shadow portion (not shown) is also specified through similar procedure (these points are hereinafter referred to as "representative points"). When the empirical curves are most concentrated in a plurality of unit cells UC, a unit cell UC which is most adaptive to an average curve (not shown) obtained by averaging a plurality of empirical curves is regarded as the representative curve.

Figure 3C:
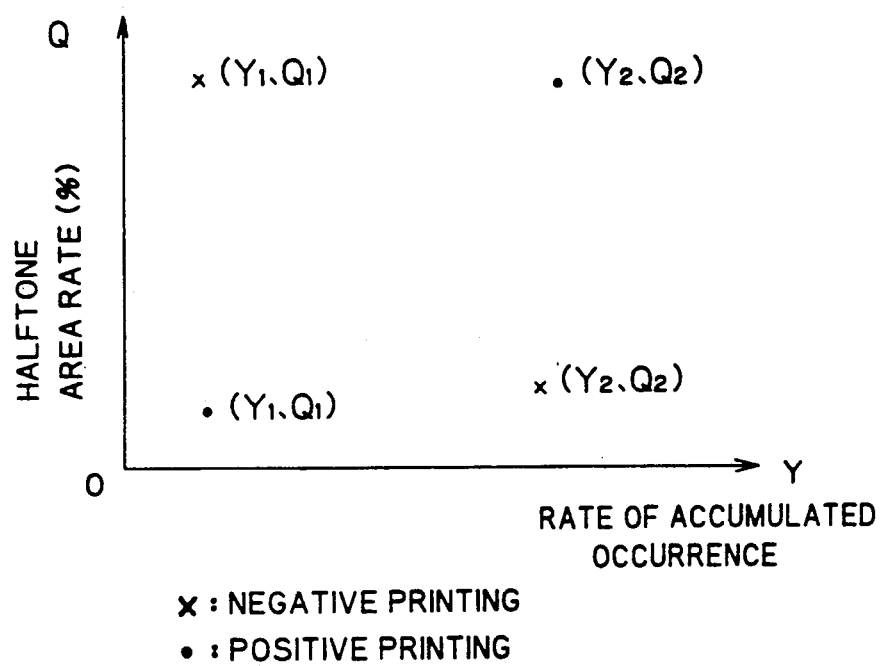
FIG. 3C is a diagram showing a plane which is formed by the rates of accumulated occurrence and the halftone area rates.

At a step S23, representative points $(Y_1, Q_1)$ and $(Y_2, Q_2)$ in highlight and shadow portions are obtained through the aforementioned procedure on a Y-Q plane which is formed with the rates Y of accumulated occurrence and the halftone area rates Q, as shown in FIG. 3C. According to various actual measurement experiments made by the inventor, representative points in a general original for negative process printing are, in most cases, as follows:

$$(Y_1, Q_1) = (0.1, 100.0) \quad (B\text{-}1a)$$

$$(Y_2, Q_2) = (99.5, 5.0) \quad (B\text{-}1b)$$

Also in consideration of variation in the image content of the original and printing conditions, the rates $Y_1$ and $Y_2$ (%) of accumulated occurrence in negative process printing can have values substantially within the following ranges shown in expressions (B-2a), (B-2B):

$$0 \leq Y_1 \leq 0.2 \quad (B\text{-}2A)$$

$$99.0 \leq Y_2 \leq 100 \quad (B\text{-}2b)$$

These values of the rates $Y_1$ and $Y_2$ of accumulated occurrence are used as those of "standard rates of accumulated occurrence" in an automatic setup step as hereinafter described. However, if $Y_1 = 0\%$ and/or $Y_2 = 100\%$, i.e., when the representative points are in range end portions of the possible full range 0% to 100% for the halftone area rates Q, the values of the said representative points are inwardly shifted by prescribed small amounts, to assume that the corrected values are standard rates of accumulated occurrence (the reason for this is described below). Thus, when the corrected values of the rates of accumulated occurrence in the highlight and shadow portions are written newly as rates $Y_1$ and $Y_2$ of accumulated occurrence, $$Y_1: 0 < Y_1 \leq 0.2 \quad (B\text{-}3a)$$

$$Y_2: 99.0 \leq Y_2 < 100 \quad (B\text{-}2b)$$

are obtained as preferable ranges. In more concrete terms, prescribed small positive amounts $\delta_1$ and $\delta_2$ are previously decided to perform correction so that the values of the rates $Y_1$ and $Y_2$ of accumulated occurence are within the following ranges:

$$Y_1: \delta_1 \leq Y_1 \leq 0.2 \quad (B\text{-}4a)$$

$$Y_2: 99.0 \leq Y_2 < (100 - \delta_2) \quad (B\text{-}4b)$$

According to various analyses made by the inventor, more preferable ranges are as follows:

$$Y_1: 0.1 \leq Y_1 \leq 0.2 \quad (B\text{-}5a)$$

$$Y_2: 99.0 \leq Y_2 < 99.6 \quad (B\text{-}5b)$$

this corresponds to such assumption that $\delta_1 = 0.1$ and $\delta_2 = 0.4$ in the expressions (B-4a) and (B-4b)). The values of the standard halftone area rates $Q_1$ and $Q_2$ are, in most cases, within the following ranges shown in expressions (B-6a), (B-6b):

$$Q_1: 99.0 \leq Q_1 \leq 100 \quad (B\text{-}6a)$$

$$Q_2: 4.5 \leq Q_2 \leq 6.5 \quad (B\text{-}6b)$$

Hence, ranges shown in Table 1 are obtained as preferable ranges of the parameter values employed in the automatic setup step.

TABLE 1

|   | Highlight portion | Shadow portion |
|---|---|---|
| Y | 0.1 ~ 0.2% | 99.0 ~ 99.6% |
| Q | 100 ~ 99.0% | 4.5 ~ 6.5% |

Similarly, the following optimum values are obtained in positive process printing:

$$(Y_1, Q_1) = (0.1, 0.0) \quad (B\text{-}7a)$$

$$(Y_2, Q_2) = (99.5, 95.0) \quad (B\text{-}7b)$$

At a step S24, a decision is made as to whether or not the aforementioned correction is to be performed. If the decision is of YES, the process is advanced to a step S25 for performing the correction. If the decision is of NO, on the other hand, the process is advanced to a step S26.

At the step S26, the values of the representative points (hence standard accumulated density values) thus obtained are stored in the memory 15. A series of processing is completed through the aforementioned steps. These steps of specifying the representative points may be carried out through the scanner shown in FIG. 1 itself, or through another system.

Figure 4:
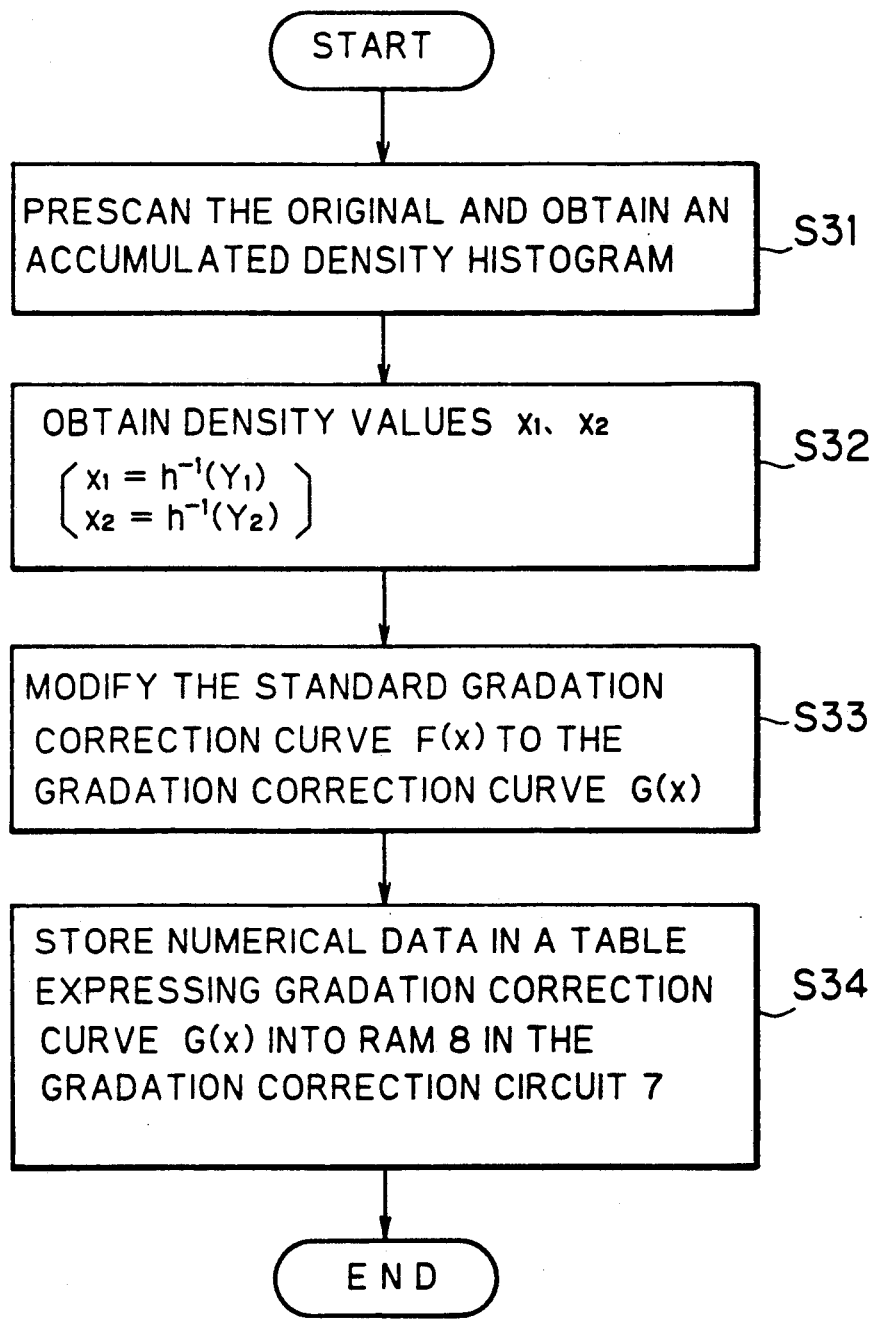
FIG. 4 is a flow chart showing the routine of actual automatic setup for the first method according to an embodiment of the present invention.
Figure 5A:
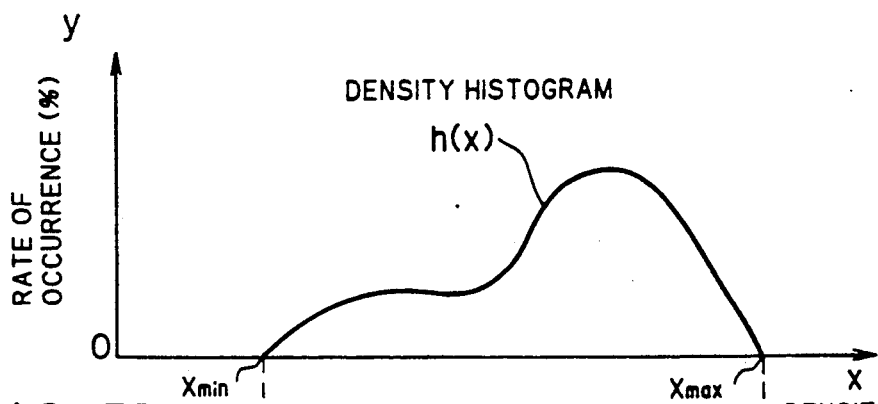
FIG. 5A is a diagram showing an density histogram used for the first method.
Figure 5B:
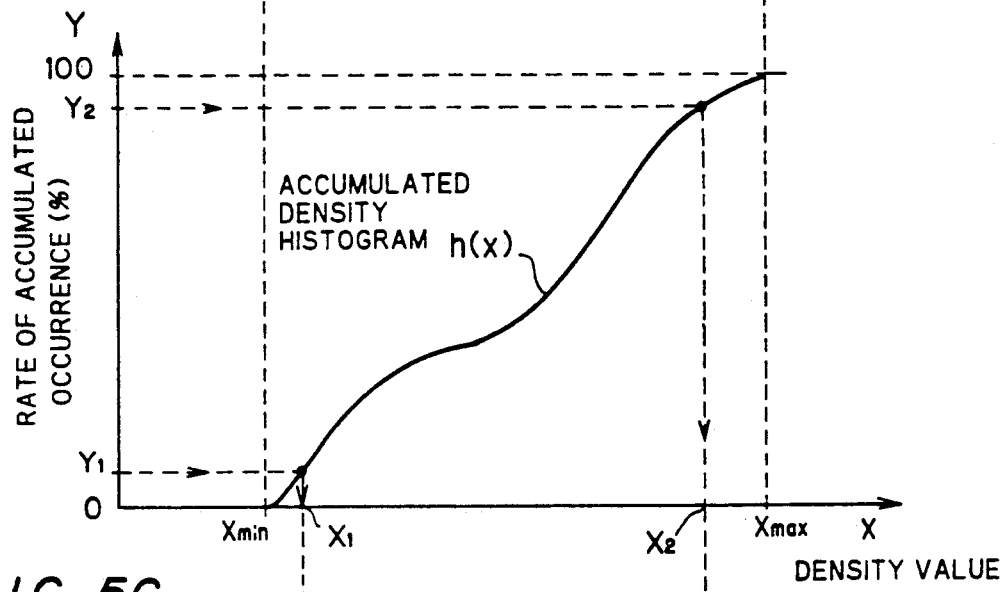
FIG. 5B is a diagram showing an accumulated density histogram created on the basis of the density histogram shown in FIG. 5A.

A setup executing step is now described. FIG. 4 is a flow chart showing the routine of actual automatic setup for the gradation correction circuit 7 with respect to the original 1. At a step S31, the selector 5 shown in FIG. 5 is connected to the histogram counting circuit 6 and the original 1 is prescanned by the image scan reader 2, to obtain an accumulated density histogram of a read region by the histogram counting circuit 6. FIG. 5A illustrates an exemplary density histogram r(x) of the original 1. The horizontal axis represents the density value x and the vertical axis represents the rate y of occurrence. FIG. 5B illustrates an accumulated density histogram h(x) created on the basis of the density histogram r(x) shown in FIG. 5A. The horizontal axis represents the density value x, and the vertical axis represents the rate Y of accumulated occurrence. Further, FIGS. 5A and 5B show the minimum density value $x_{min}$ and the maximum density value $x_{max}$ in an image of the original 1.

At a step S32, the values of the standard rates $Y_1$ and $Y_2$ of accumulated occurrence are read from the memory 15, to obtain density values $x_1$ and $x_2$ respectively corresponding to the values $Y_1$ and $Y_2$ in the accumulated density histogram h(x) shown in FIG. 5B (these density values $x_1$ and $x_2$ correspond to "standard density values" in the present method).

Figure 5C:
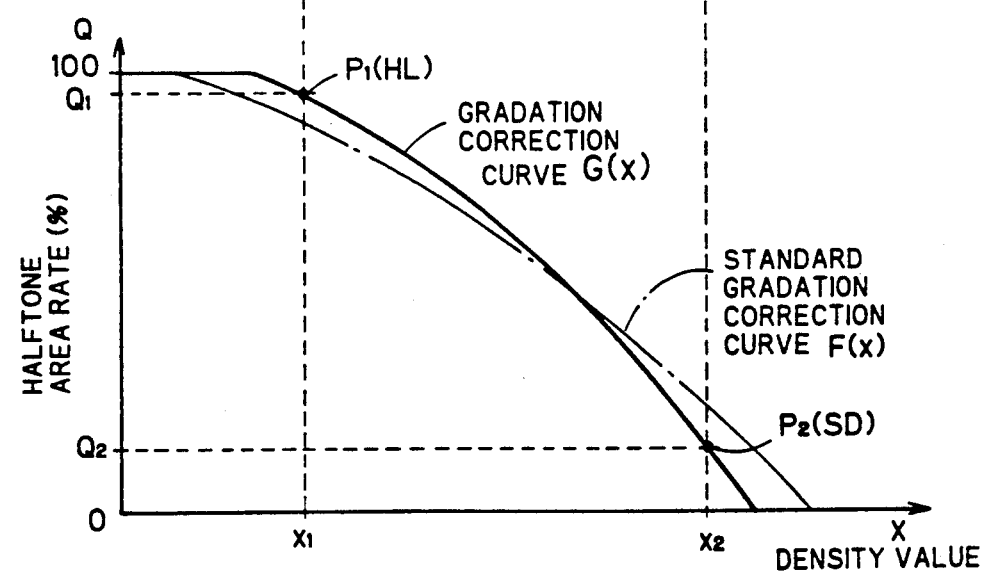
FIG. 5C is a diagram showing a gradation correction curve for the first method.

At a step S33, values of the standard halftone area rates $Q_1$ and $Q_2$ are read from the memory 15, to set the following two points:

$$P_1(x_1, Q_1) \quad (B\text{-}8)$$

$$P_2(x_2, Q_2) \quad (B\text{-}9)$$

on a gradation correction plane (x/Q plane) shown in FIG. 5C as a highlight point HL and a shadow point SD. FIG. 5C shows the case of negative process printing. In more concrete terms, the standard gradation correction curve F(x) previously stored in the memory 15 is corrected to pass through the two points $P_1$ and $P_2$, thereby to obtain a desired gradation correction curve G(x). This correction can be performed as follows, for example:

$$G(x) = \{\Delta Q \cdot F(x) - \Delta(QF)\}/\Delta F \quad (B\text{-}10)$$

$$\Delta Q = Q_2 - Q_1 \quad (B\text{-}11)$$

$$\Delta(QF) = Q_1 F(x_2) - Q_2 F(x_1) \quad (B\text{-}12)$$

$$\Delta F = F(x_2) - F(x_1) \quad (B\text{-}13)$$

At a step S34, data expressing the gradation correction curve G(x) is stored in the RAM 8 in a look-up table format, to complete the setup operation for the gradation correction circuit 7.

In such an automatic setup process, it is important that the accumulated density histogram h(x) is used. Namely, the respective density values $x_1$ and $x_2$ of the highlight point $P_1$ and the shadow point $P_2$ are automatically set while reflecting the density state of the image of the original 1 with respect to the prescribed values of the rates $Y_1$ and $Y_2$ of accumulated occurrence. When the rate of increase (inclination of h(x)) of the accumulated density histogram h(x) in the highlight portion is small, for example, the highlight density value $x_1$ is automatically set at a relatively large value. Thus, the desirable gradation correction curve G(x) is so obtained that the highlight point $P_1$ approaches a higher density side as the total area of low-density regions is reduced in the image of the original 1, to increase gradation expressibility in relatively high density regions. Desirable setting is also performed in the shadow point $P_2$ in response to the accumulated density histogram h(x).

A second feature of this embodiment resides in that the numerical values of the respective values $Y_1$, $Y_2$, $Q_1$ and $Q_2$ obtained through the preparation steps are employed. Namely, while the values of the rates $Y_1$ and $Y_2$ of accumulated occurrence can be arbitrarily decided in general, such values $Y_1$ and $Y_2$ are set through statistic analyses of sample pictures in the above embodiment.

This means that automation making the best use of skilled operator's experience can be implemented by utilizing the highlight and shadow point density values, which are empirically assumed to be desirable, for the automatic setup operation.

Empirical data are also skillfully incorporated with respect to the standard halftone area rates $Q_1$ and $Q_2$. When the empirical curves are concentrated in $Y_1 = 0\%$ and/or $Y_2 = 100\%$, the aforementioned correction is performed on the rates $Y_1$ and $Y_2$ of accumulated occurrence for the following reason: First, it is noted that error(s) may be caused in a point (minimum density value $x_{min}$) of rise from 0% and/or a point (maximum density value $x_{max}$) reaching 100% in the accumulated density histogram h(x) by a trimming error of the original 1, noise etc. If the values of $Y_1 = 0\%$ and $Y_2 = 100\%$ are directly regarded as the standard rates of accumulated occurrence in this case, the highlight and shadow points $P_1$ and $P_2$ are inevitably decided to include the minimum density values $x_{min}$ and the maximum density value $x_{max}$ as values having errors. Consequently, gradation reproducibility in a finished image may be lost in the vicinity of true minimum and maximum density values.

Through the aforementioned correction, on the contrary the highlight and shadow points $P_1$ and $P_2$ are decided to have error margins to some extent, thereby to cope with the aforementioned circumstances.

C. Second Method

Description is now made on a second method, which is adapted to set highlight and shadow points on the basis of data of a plurality of previously prepared sample pictures, similarly to the aforementioned first method.

Figure 6:
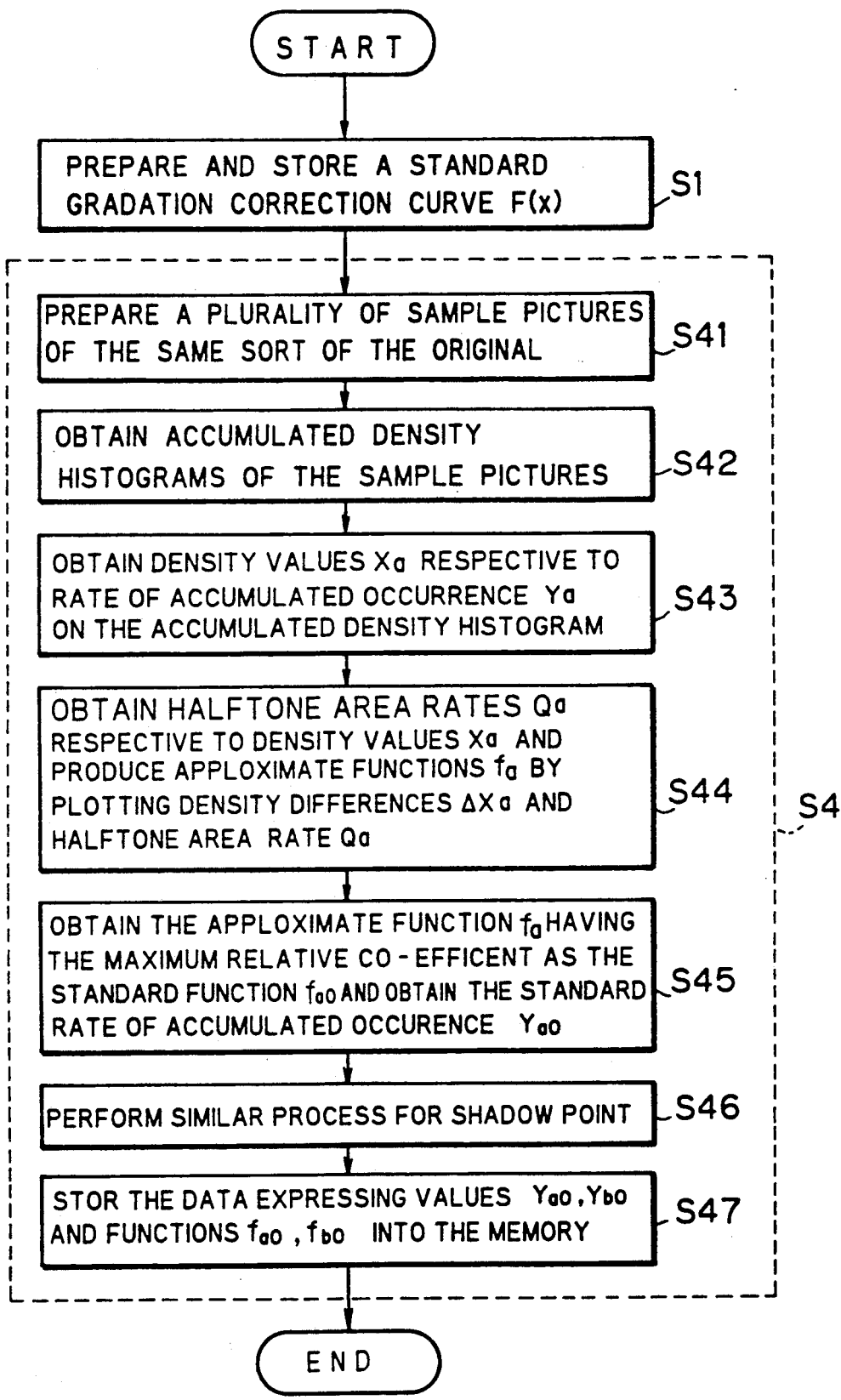
FIG. 6 is a flow chart showing preparation steps in the second method according to an embodiment of the present invention.

FIG. 6 is a flow chart showing preparation steps in the second method. In preparation for setup operation in the gradation correction circuit 7, an empirically used standard gradation correction curve F(x) (refer to FIG. 9C as described below), which is the function of a density value x, is prepared similarly to the aforementioned first method, and data expressing the same is stored in the memory 15.

In a subsequent step group S4, parameter values and functions for the automatic setup operation are decided as follows (the step S1 and the step group S4 may be reversed in order): At a step S41, the type of an original is specified in relation to application thereof, similarly to the aforementioned first method. Then, a plurality of sample pictures belonging to this type are prepared.

At a step S42, accumulated density histograms of images are obtained with respect to these sample pictures (refer to FIG. 9A as described below).

At a step S43, corresponding density values $x_a$ and $x_b$ are obtained with respect to various values of rates $Y_a$ and $Y_b$ of accumulated occurrence, served as parameters, in the accumulated density histograms of the respective sample pictures thus obtained. The rates $Y_a$ of accumulated occurrence are highlight-side values, which are selected from various values within a range close to 0%. The rates $Y_b$ of accumulated occurrence are shadow-side values, which are selected from various values within a range close to 100%. The following description refers to only the highlight side, while procedure for the shadow side is absolutely similar to the same.

Figure 7A:
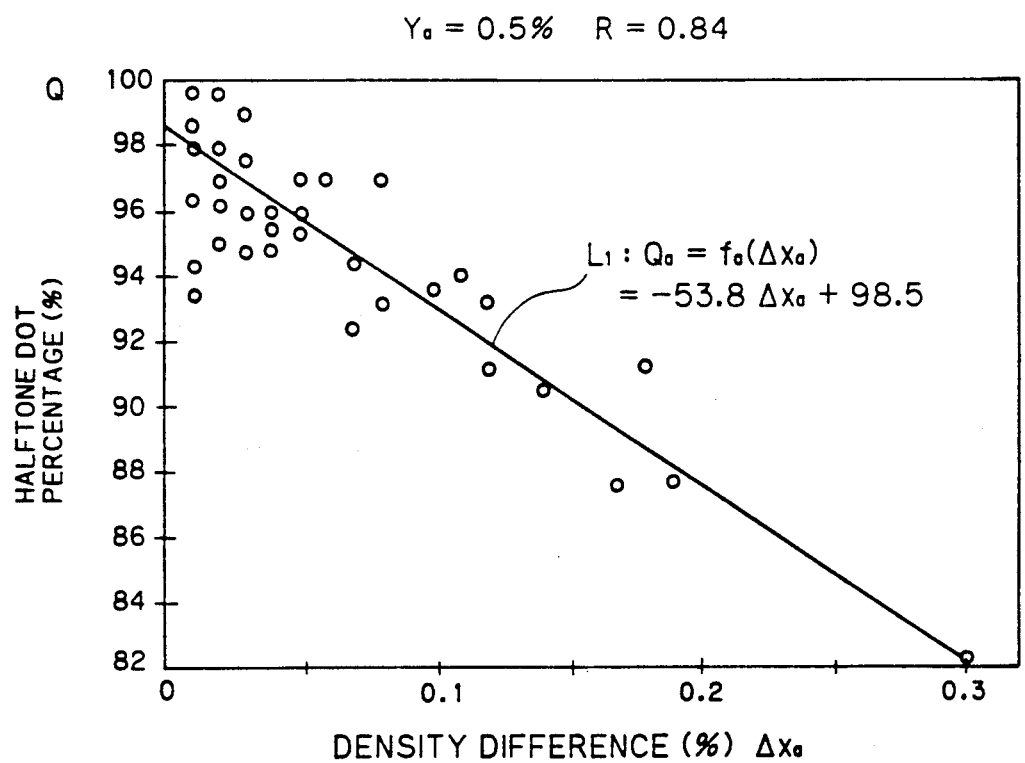
FIG. 7A is a diagram showing an approximate function.

At a step S44, density differences $\Delta x_a$ ($= x_a - x_{min}$) with respect to various values of the rates $Y_a$ of accumulated occurrence from the respective density values $x_a$ and the minimum density value $x_{min}$ in corresponding accumulated density histograms. Further, halftone area rates $Q_a$ empirically set in correspondence to the respective density values $x_a$ are obtained. The rates $Y_a$ of accumulated occurrence are regarded as parameters to plot the density differences $\Delta x_a$ obtained with respect to the sample pictures and the halftone area rates $Q_a$ on coordinates. FIGS. 7A and 7B illustrate exemplary results of such plotting, on the assumption that $Y_a = 0.5\%$, 1.0% as to the case of negative recording.

Further, approximate functions $f_a(\Delta x_a)$ by linear functions, for example, are obtained with respect to the plotted points through a least square method or the like. The approximate functions $f_a(\Delta x_a)$ statistically express relations between density distribution states in highlight portions of the sample pictures and empirically set halftone area rates Q for respective values of the rates $Y_a$ of accumulated occurrence.

The approximate functions $f_a(\Delta x_a)$ thus obtained are successively obtained while changing the rates $Y_a$ of accumulated occurrence. Correlation coefficients R are obtained from the plotted points and the approximate functions $f_a(\Delta x_a)$ thereof. Referring to FIG. 7A, the approximate functions $f_a(\Delta x_a)$ are linear functions $L_1$:

$$Q_a = -53.8 \Delta x_a + 98.5 \quad (C-1)$$

and the correlation coefficients R are:

$$R = 0.84 \quad (C-2)$$

Referring to FIG. 7B, the approximate functions $f_a(\Delta x_a)$ are linear functions $L_2$:

$$Q_a = -59.9 \Delta x_a + 98.5 \quad (C-3)$$

and the correlation coefficients R are:

$$R = 0.91 \quad (C-4)$$

At a step S45, an approximate function $f_a(\Delta x_a)$, having the maximum correlation coefficient R within those obtained at the step S44 is regarded as a standard function $f_{a0}(\Delta x_a)$. Further, the rate $Y_a$ of accumulated occurrence currently employed as a parameter is regarded as a standard rate $Y_{a0}$ of accumulated occurrence.

In the examples shown in FIGS. 7A and 7B, the rate $Y_a$ of accumulated occurrence = 1.0% shown in FIG. 7B has the maximum correlation coefficient R = 0.91, whereby the standard function $f_{a0}(\Delta x_a)$ becomes the linear function $L_2$ and the standard rate $Y_{a0}$ of accumulated occurrence = 1.0%.

At a step S46, a standard function $f_{b0}(\Delta x_b)$ and a standard rate $Y_{b0}$ of accumulated occurrence for the shadow point are also obtained in a similar manner.

Within the information thus obtained, the values $Y_{a0}$ and $Y_{b0}$ are adapted to indicate portions of the accumulated density histograms to be noted in order to most effectively reflect the rule of thumb in the setup operation. Further, the functional forms $f_{a0}(\Delta x_a)$ and $f_{b0}(\Delta x_b)$ are functions objectively expressing the rule of thumb corresponding to these values.

According to actual measurement experiments made by the inventor, $$Y_{a0} = 1.0\%, \quad Y_{b0} = 99.0\% \quad (C-5)$$

in most cases, and even if various conditions are changed, they are in the range, $$0.5\% \leq Y_{a0} \leq 5.0\% \quad (C-6)$$

$$95.0\% \leq Y_{b0} \leq 99.5\% \quad (C-7)$$

in most cases.

At a step S47, the functions $f_{a0}$ and $f_{b0}$ and the values $Y_{a0}$ and $Y_{b0}$ thus obtained are stored in the memory 15, to complete the series of preparation steps.

The aforementioned steps may be carried out through the scanner shown in FIG. 1 itself, or through another system.

Figure 8A:
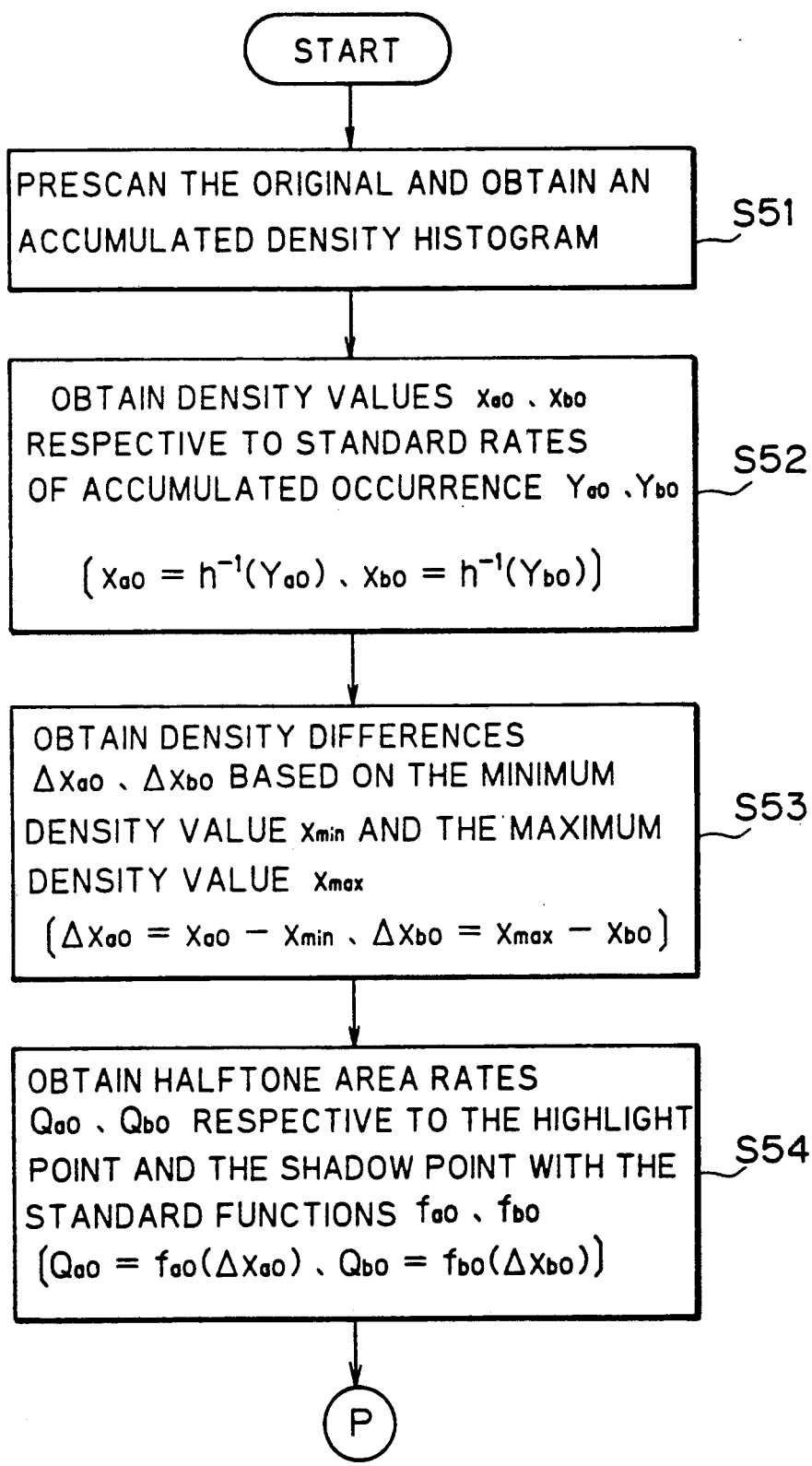
FIGS. 8A and 8B are flow charts showing the routine of actual automatic setup for the second method according to an embodiment of the present invention.
Figure 8B:
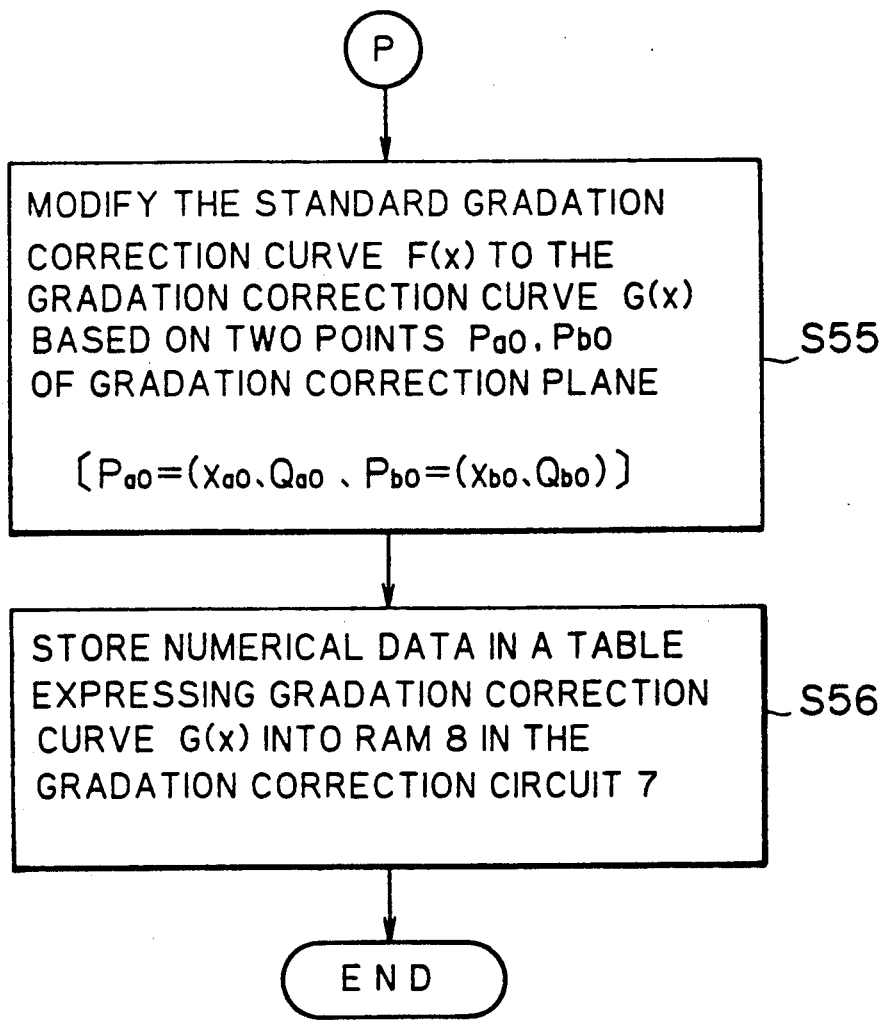

Description is now made on setup executing steps. FIGS. 8A and 8B are flow charts showing the routine of actual automatic setup operation of the gradation correction circuit 7 with respect to the original 1. At a step S51 in FIG. 8A, the selector 5 shown in FIG. 1 is connected to the histogram counting circuit 6 and the original to be duplicated is prescanned by the image scan reader 2, to obtain an accumulated density histogram of a region to be read by the histogram counting circuit 6. This processing is similar to the aforementioned processing at the step S3 shown in FIG. 4. An accumulated density histogram h(x) shown in FIG. 9A is obtained from the density histogram of the original 1. The minimum density value $x_{min}$ and the maximum density value $x_{max}$ in an image of the original 1 are as shown in the figure.

Figure 9A:
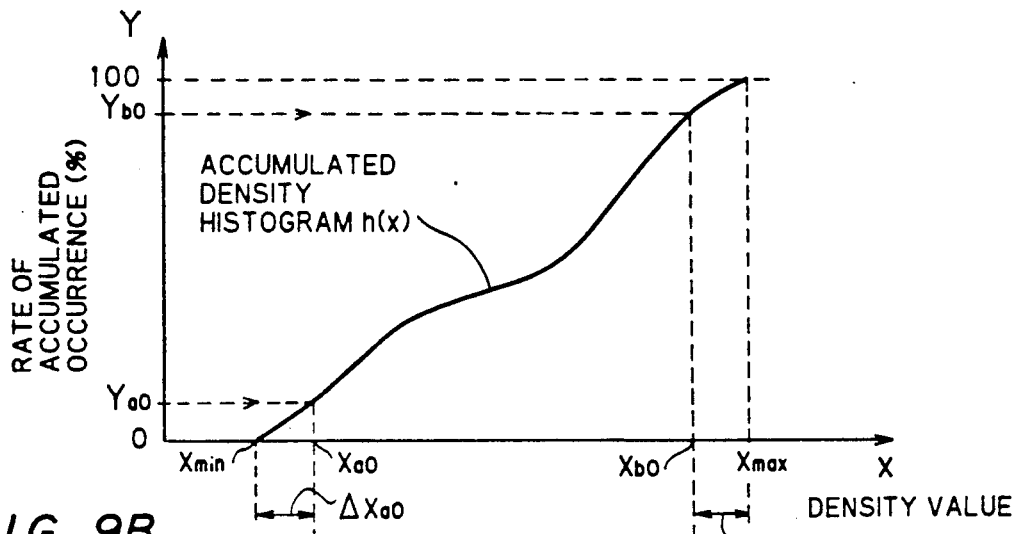
FIG. 9A is a diagram showing an accumulated density histogram used for the second method.

At a step S52, values of standard rates $Y_{a0}$ and $Y_{b0}$ of accumulated occurrence are read from the memory 15 as shown in FIG. 9A, to obtain density values $x_{a0}$ and $x_{b0}$ respectively corresponding to the values $Y_{a0}$ and $Y_{b0}$ in the accumulated density histogram h(x) (the density values $x_{a0}$ and $x_{b0}$ correspond to "standard density values" in the present method).

At a step S53, density differences $\Delta x_{a0}$ (=$x_{a0}-x_{min}$) and $\Delta x_{b0}$ (=$x_{max}-x_{b0}$) are obtained on the basis of the standard density values $x_{a0}$ and $x_{b0}$, the minimum density value $x_{min}$ and the maximum density value $x_{max}$ of the original 1. Since the values $Y_{a0}$ and $Y_{b0}$ are commonly employed for the same type of originals to be duplicated, values of the density differences $\Delta x_{a0}$ and $\Delta x_{b0}$ are values reflecting inclination values (under linear approximation):

$$Y_{a0}/\Delta x_{a0} \qquad (C-8)$$

$$(100-Y_{b0})/\Delta x_{b0} \qquad (C-9)$$

of the accumulated density histogram h(x) in respective ones of density ranges:

$$x_{min} \leq x \leq x_{a0} \qquad (C-10)$$

$$x_{b0} \leq x \leq x_{max} \qquad (C-11)$$

Figure 9B:
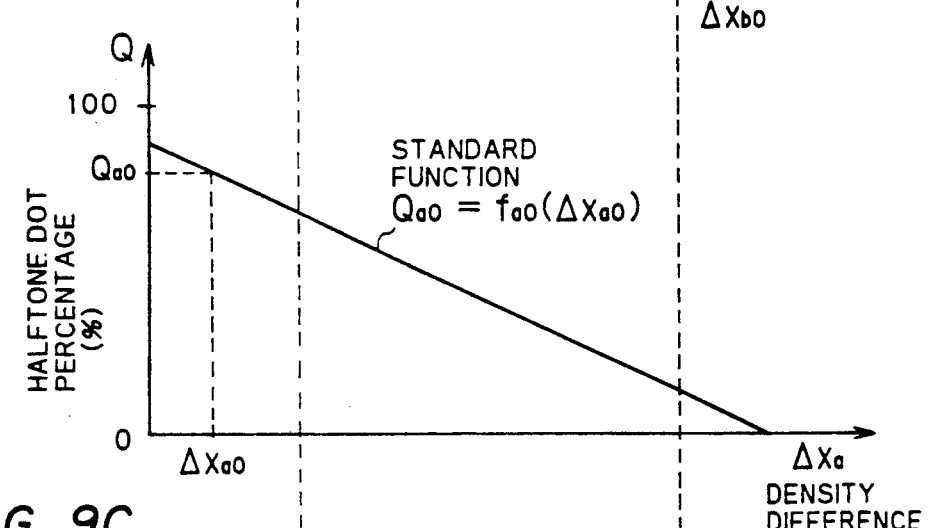
FIG. 9B is a diagram showing a standard function used for the second method.

At a step S54, the density differences $\Delta x_{a0}$ and $\Delta x_{b0}$ thus obtained are substituted in standard functions $f_{a0}(\Delta x_a)$ and $f_{b0}(\Delta x_b)$, to obtain a standard halftone area rate $Q_{a0}$ for a highlight point and a standard halftone area rate $Q_{b0}$ for a shadow point. FIG. 9B shows only the highlight side within such setting.

Figure 9C:
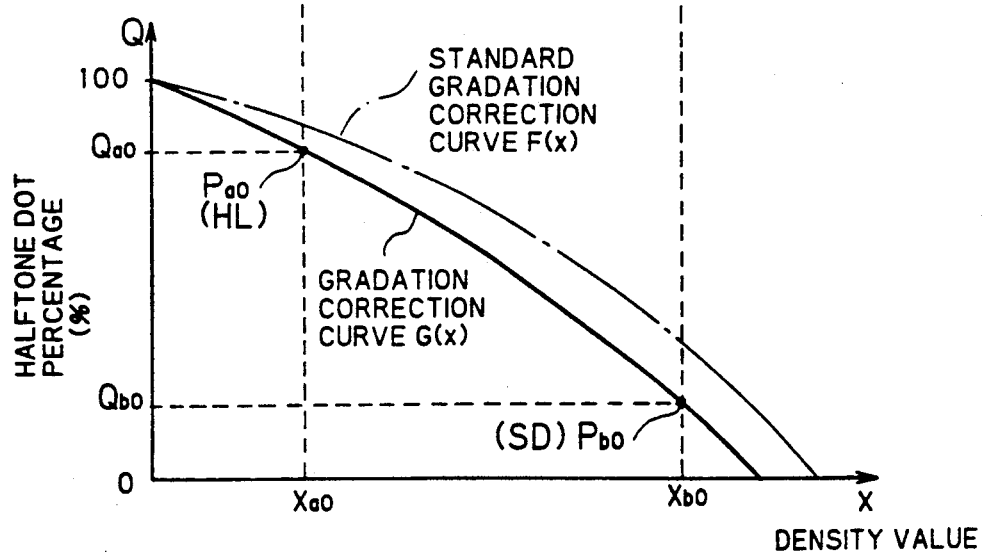
FIG. 9C is a diagram showing a gradation correction curve for the second method.

The following two points on a gradation correction plane (x/Q plane) shown in FIG. 9C are set as a highlight point HL and a shadow point SD respectively:

$$P_{a0}(x_{a0}, Q_{a0}) \qquad (C-12)$$

$$P_{b0}(x_{b0}, Q_{b0}) \qquad (C-13)$$

FIGS. 9B and 9C show the case of negative process printing.

At a step S55, a standard gradation correction curve F(x) previously stored in the memory 15 is modified to pass through the two points $P_{a0}$ and $P_{b0}$ thereby to obtain a desired gradation correction curve G(x). This modification can be performed through the following expressions (C-14) to (C-17), similarly to the aforementioned first method, for example:

$$G(x)=\{\Delta Q \cdot F(x)+\Delta(QF)\}/\Delta F \qquad (C-14)$$

$$\Delta Q=Q_{b0}-Q_{a0} \qquad (C-15)$$

$$\Delta(QF)=Q_{a0}F(x_{b0})-Q_{b0}F(x_{a0}) \qquad (C-16)$$

$$\Delta F=F(x_{b0})-F(x_{a0}) \qquad (C-17)$$

At a step S56, the data expressing the gradation correction curve G(x) is stored in the RAM 8 in a look-up table format, thereby to complete the setup operation in the gradation correction circuit 7.

In such an automatic setup process, it is important that the accumulated density histogram h(x) is used similarly to the aforementioned first method. Namely, with respect to the prescribed values $Y_{a0}$ and $Y_{b0}$, the respective density values $x_{a0}$ and $x_{b0}$ of the highlight point $P_{a0}$ and the shadow point $P_{b0}$ are automatically set to reflect the density state of the image of the original 1. When the rate of increase (inclination of h(x) in the highlight portion of the accumulated density histogram h(x) is small and the difference between the minimum density value $x_{min}$ and the density value $x_{a0}$ is large, for example, the highlight density value $X_{a0}$ is automatically set at a relatively large value. Therefore, the highlight point $P_{a0}$ approaches a higher density side as the total area of low-density regions in the image of the original 1 to be duplicated is reduced, whereby gradation expressibility is improved in relatively high density regions and a desirable gradation correction curve G(x) can be obtained. Also in the shadow point $P_{b0}$, desirable setting is performed in response to the accumulated density histogram h(x). Since inclination values of the accumulated density histogram h(x) in the highlight and shadow portions are evaluated through linear approximation, operation is easy and influence is hardly exerted by local errors caused in the highlight and shadow portions of the accumulated density histogram h(x).

A second feature of this embodiment resides in employment of the values $Y_{a0}$ and $Y_{b0}$ and the standard functions $f_{a0}(\Delta x_a)$ and $f_{b0}(\Delta x_b)$ obtained from the rule of thumb.

This means that automation making the best use of skilled operator's experience can be implemented by employing the rule of setting highlight and shadow points, which are empirically regarded as desirable, for the automatic setup operation similarly to the aforementioned first method.

D. Third Method

Description is now made on a third method of producing a desired gradation correction curve by composing a plurality of previously prepared standard gradation correction curves.

Figure 10:
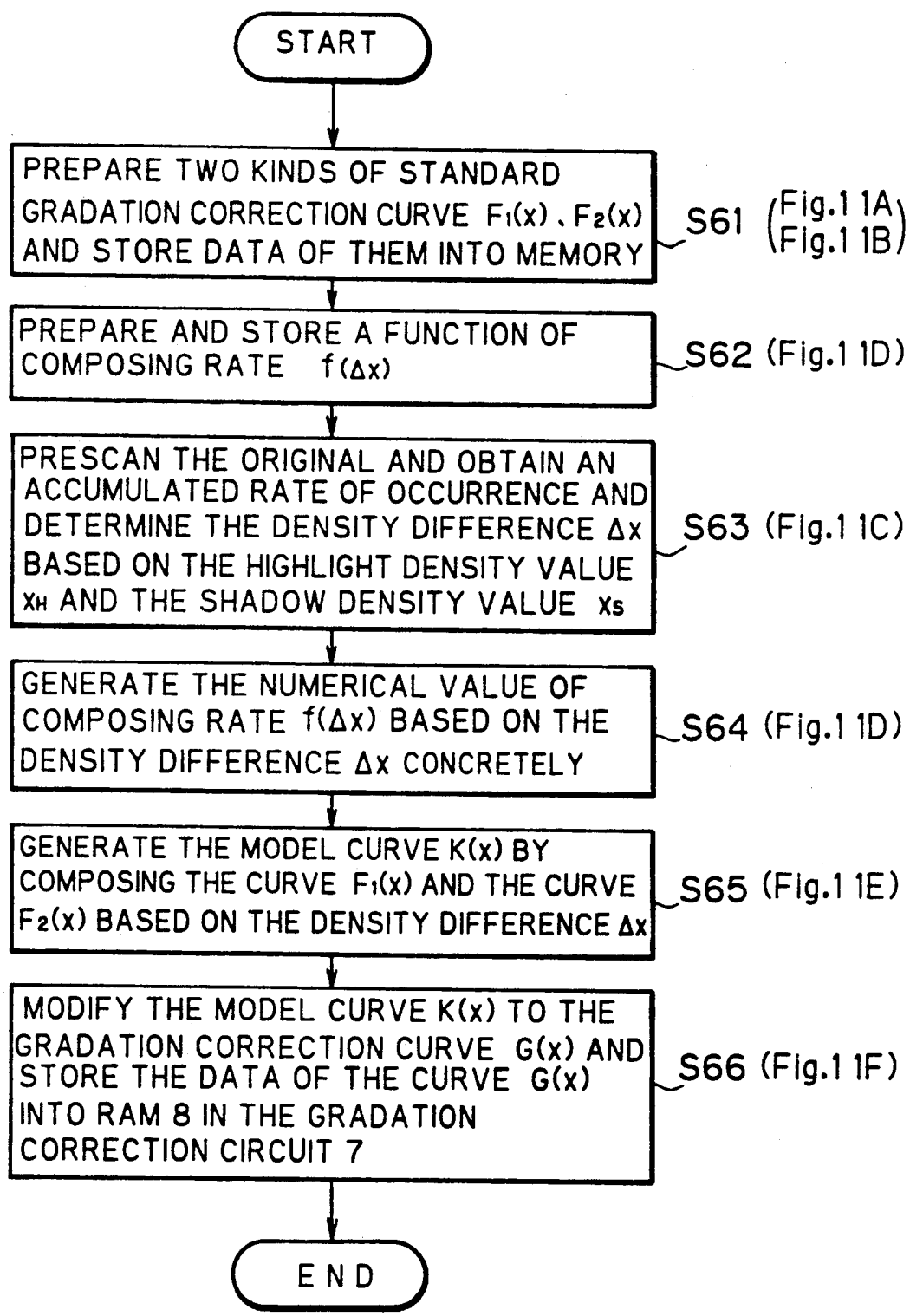
FIG. 10 is a flow chart showing the routine of the third method according to an embodiment of the present invention.

FIG. 10 is a flow chart showing the procedure of the third method. FIGS. 11A to 11F are conceptual diagrams typically showing the contents of the processing shown in FIG. 10. Referring to FIG. 10, the respective steps correspond to the figures whose numbers are shown in the right-hand sides thereof.

Figure 11A:
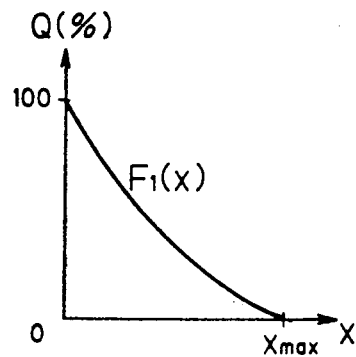
FIGS. 11A to 11F are diagrams showing the contents of the processing shown in FIG. 10.
Figure 11B:
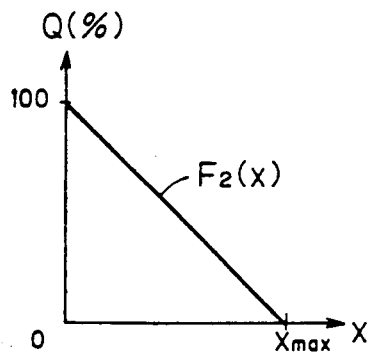

At a step S61 in FIG. 10, two types of standard gradation correction curves $F_1(x)$ and $F_2(x)$, which are functions of a density value x and curved simply in different single directions, are prepared and data expressing the same are stored in the memory 15. In this embodiment, an empirically obtained upward convex curve shown FIG. 11A is employed as the standard gradation correction curve $F_1(x)$, and a straight line shown in FIG. 11B is employed as the standard gradation correction curve $F_2(x)$. Referring to FIGS. 11A and 11B, the range of the density value x shown in the horizontal axes is from "0" to the maximum density value $x_{max}$, and the range of halftone area rates Q shown in the vertical axes is from 0% to 100%.

At a step S62, a composing ratio function is prepared. The form of a composing ratio function f($\Delta x$) shown in FIG. 11D is decided in preparation for composition of the two standard gradation correction curves $F_1(x)$ and $F_2(x)$, and data expressing the same is also stored in the memory 15. A density area $\Delta x$ is defined as difference between a shadow point density value $x_S$ and a highlight point density value $x_H$ (refer to FIG. 11C described below), as follows:

$$\Delta x = x_S - x_H \quad (D\text{-}1)$$

to serve as a parameter showing width of the density area of the original.

As shown in FIG. 11D, the value and the form of the composing ratio function $f(\Delta x)$ are set by numerical relation between predetermined constant values $\Delta x_1$ and $\Delta x_2$ ($\Delta x_1 < \Delta x_2$) and the density area $\Delta x$. The value become a constant (maximum value) $f_{max}$ in a first range of:

$$0 \leq \Delta x \leq \Delta x_1 \quad (D\text{-}2)$$

the form of the function $f(\Delta x)$ becomes a straight line having a negative inclination in a second range of:

$$\Delta x_1 \leq \Delta x < \Delta x_2 \quad (D\text{-}3)$$

and the value becomes a constant value of "0" in a third range of $$\Delta x_2 \leq \Delta x \quad (D\text{-}4)$$

In this embodiment, $$f_{max} = 2.0 \quad (D\text{-}5)$$

The reason why such a functional form is employed as the composing ratio function $f(\Delta x)$ is as described below. FIG. 11D shows such a critical density area value $\Delta x_C$ that the value of the function $f(\Delta x)$ is 1.0.

At a step S63, the density values $x_H$ and $x_S$ are decided. The original 1 is prescanned to obtain an accumulated density histogram $h(x)$ in a read region of the original 1, as shown in FIG. 11C. This is performed through the histogram counting circuit 6 shown in FIG. 1.

Values $Y_1$ and $Y_2$ of rates Y of accumulated occurrence, which are empirically considered to have high probabilities of becoming highlight and shadow points, are designated and a pair of density values respectively corresponding to these values $Y_1$ and $Y_2$ are assumed to be the highlight point density value $x_H$ and the shadow point density values $x_S$ respectively in the accumulated density histogram $h(x)$. FIG. 11C shows the minimum density value $x_{min}$ and the maximum density value $x_{max}$ respectively.

At a step S64, a composing ratio is specified. The density area $\Delta x$ ($= x_S - x_H$) is calculated on the basis of the density values $x_H$ and $x_S$ obtained at the step S63. The composing ratio $f(\Delta x)$ shown in FIG. 11D is stored in a lookup table, and the value of composing ratio $f(\Delta x)$ is obtained by inputting the value of the aforementioned density area $\Delta x$.

At a step S65, the standard gradation correction curves $F_1(x)$ and $F_2(x)$ are composed with each other along the following expression (D-6) through the composing ratio $f(\Delta x)$ thus obtained, thereby to obtain a model curve $K(x)$:

$$K(x) = \{1 - f(\Delta x)\} F_1(x) + f(\Delta x) F_2(x) \quad (D\text{-}6)$$

This model curve $K(x)$ has the following properties: When the density area $\Delta x$ of the original 1 belongs to a narrow density range of:

$$0 \leq \Delta x < \Delta x_C \quad (D\text{-}7)$$

$f(\Delta x) > 1.0$ as shown in FIG. 11D, and the coefficient of $F_1(x)$ is negative along the expression (D-6). Hence, the model curve $K(x)$ is upwardly convex (curve $K_1(x)$ in FIG. 11E) led from the forms of the standard gradation correction curves $F_1(x)$ and $F_2(x)$ shown in FIGS. 11A and 11B.

In a wide density range of:

$$\Delta x_C < \Delta x \quad (D\text{-}8)$$

on the other hand, $f(\Delta x) < 1.0$ from FIG. 11D, and both of coefficients of the curves $F_1(x)$ and $F_2(x)$ in the right side of the expression (D-6) are positive. Thus, the model curve $K(x)$ is downwardly convex (curve $K_2(x)$ in FIG. 11E).

Figure 11E:
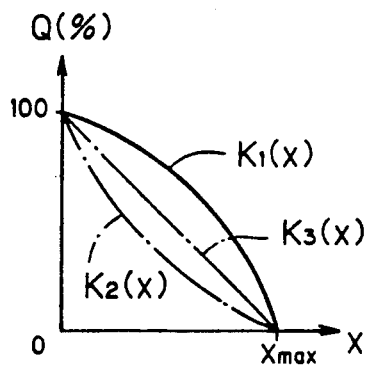

Further, in a critical density range of:

$$\Delta x = \Delta x_C \quad (D\text{-}9)$$

therebetween, $f(\Delta x) = 1.0$, and the model curve $K(x)$ becomes straight from the expression (D-6) (curve $K_3(x)$ in FIG. 11E).

Thus, through composition in the aforementioned mode, the model curve $K(x)$ is curved in a state selected from three types including an upwardly convex state, a downwardly convex state and a straight state in response to the value of the density area $\Delta x$. As understood from FIG. 11D, the absolute value of curvature of the curve $K(x)$ is also changed within a range of:

$$\Delta x_1 < \Delta x < \Delta x_2 \quad (D\text{-}10)$$

Figure 11F:
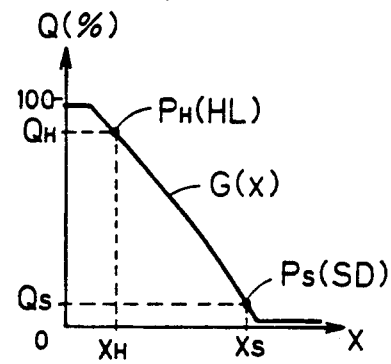
Figure 11C:
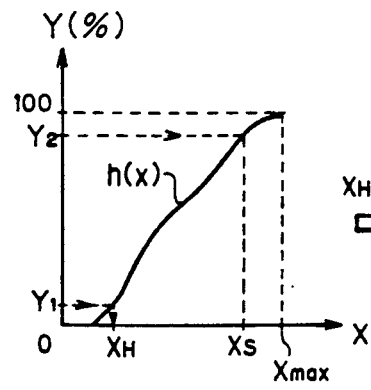
Figure 11D:
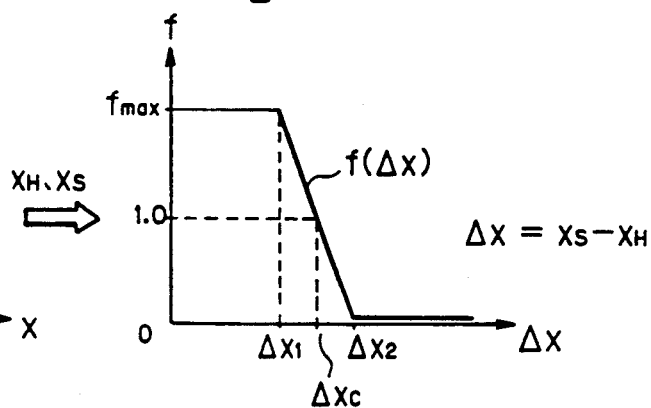

At a step S66, the model curve $K(x)$ thus obtained is modified to pass through a designated highlight point $P_H$:

$$P_H = (x_H, Q_H) \quad (D\text{-}11)$$

and a shadow point $P_S$:

$$P_S = (x_S, Q_S) \quad (D\text{-}12)$$

on a gradation correction coordinate plane (x-Q plane), thereby to obtain a gradation correction curve $G(x)$ as shown in FIG. 11F. In this modification, empirically found halftone area rates $Q_H$ and $Q_S$ of the highlight and shadow points, which are previously stored in the memory 15, are employed. In more concrete terms, this modification is executed through the following expressions (D-13) to (D-16):

$$G(x) = \{\Delta Q \cdot K(x) + \Delta(QK)\}/\Delta K \quad (D\text{-}13)$$

$$\Delta Q = Q_S - Q_H \quad (D\text{-}14)$$

$$\Delta(QK) = Q_H K(x_S) - Q_S K(x_H) \quad (D\text{-}15)$$

$$\Delta K = K(x_S) - K(x_H) \quad (D\text{-}16)$$

FIG. 11F illustrates an exemplary gradation correction curve $G(x)$ in the case of negative process printing, which is obtained from the model curve $K(x)$ shown in FIG. 11E. The gradation correction curve $G(x)$ thus obtained is stored in the RAM 8 in a look-up table, thereby to complete the setup operation in the gradation correction circuit 7.

Since the gradation correction curve $G(x)$ is obtained by scaling and shifting of the model curve $K(x)$ as understood from the expressions (D-13) to (D-16), the curved state of the model curve $K(x)$ is substantially reflected to that of the gradation correction curve $G(x)$.

In the case of negative output, therefore, the gradation correction curve G(x) is upwardly convex with respect to the original of a narrow density area, while the same is downwardly convex with respect to a wide density area.

Figure 12:
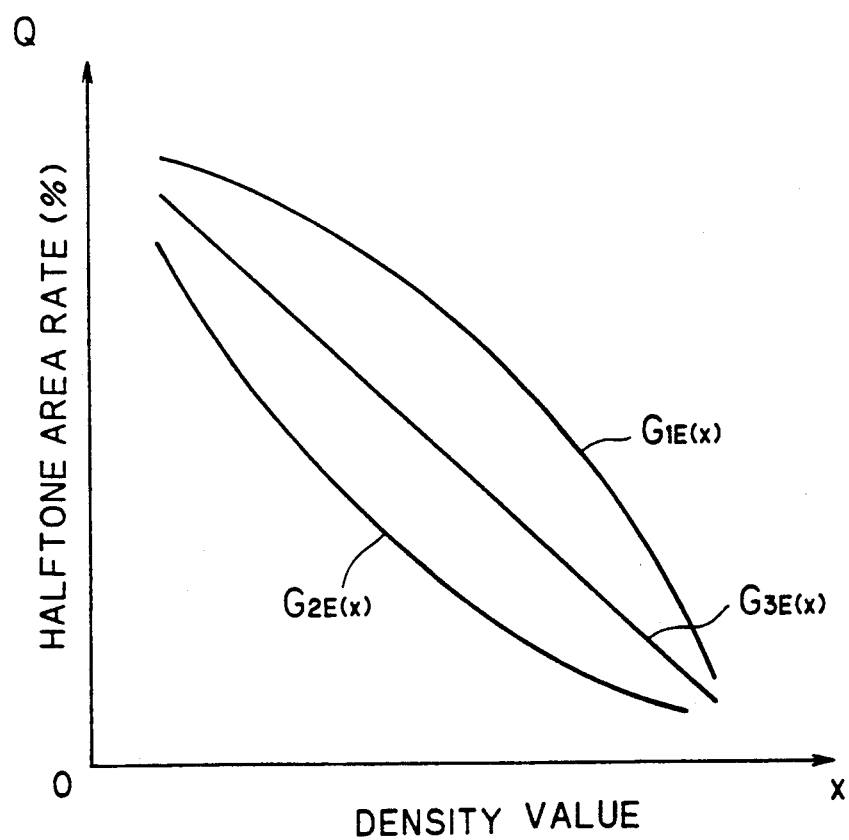
FIG. 12 is a diagram showing a gradation correction curves for the third method.

This property is consistent to the rule of thumb. It has been proved through an analysis made by the inventor that a skilled operator empirically creates a gradation correction curve of negative output in the form of an upwardly convex curve $G_{1E}(x)$ with respect to an original of a narrow density range, in the form of a downward convex curve $G_{2E}(x)$ in a wide density range and in the form of a linear curve $G_{3E}(x)$ in a middle range, as shown in FIG. 12. Hence, the above embodiment is a technique of implementing automation for generating a gradation correction curve while satisfying the rule of thumb.

The third method is also applicable to the case of positive process printing, as a matter of course. In the case of such positive output, the gradation correction curve G(x) is downwardly convex with respect to an original of a narrow density range, while the same is upwardly convex with respect to an original of a wide density range. Although the structure is simplified by employing composition of the two types of standard gradation correction curves $F_1(x)$ and $F_2(x)$ as in the aforementioned embodiment, a polynominal relating to the density value x may be prepared to change coefficients thereof in response to the density area Ax, thereby to change the curved state. In any case, the curved state can be selected from a state group including at least an upward convex state and a downward convex state.

Also in the case of employing the composing steps, the method can be applied with the standard gradation correction curves $F_1(x)$ and $F_2(x)$ which have different curved states each other, such that the curve $F_2(x)$ may be downward convex for example. A Munsell curve or the like can be employed. Further, the composition is not restricted to the linear composition shown in the expression (D-6).

Although the difference $(x_S - x_H)$ between the highlight point density value $x_H$ and the shadow point density value $x_S$ is employed as the density area x in the aforementioned embodiment, difference $(x_{max} - x_{min})$ between the maximum density value $x_{max}$ and the minimum density value $x_{min}$ in FIG. 11C may be employed in substitution therefor.

E. End Portion Correcting Method

Description is now made on a method of performing correction on both end portions of highlight and shadow sides of the gradation correction curve G(x) obtained through the aforementioned first, second or third method.

Figure 13:
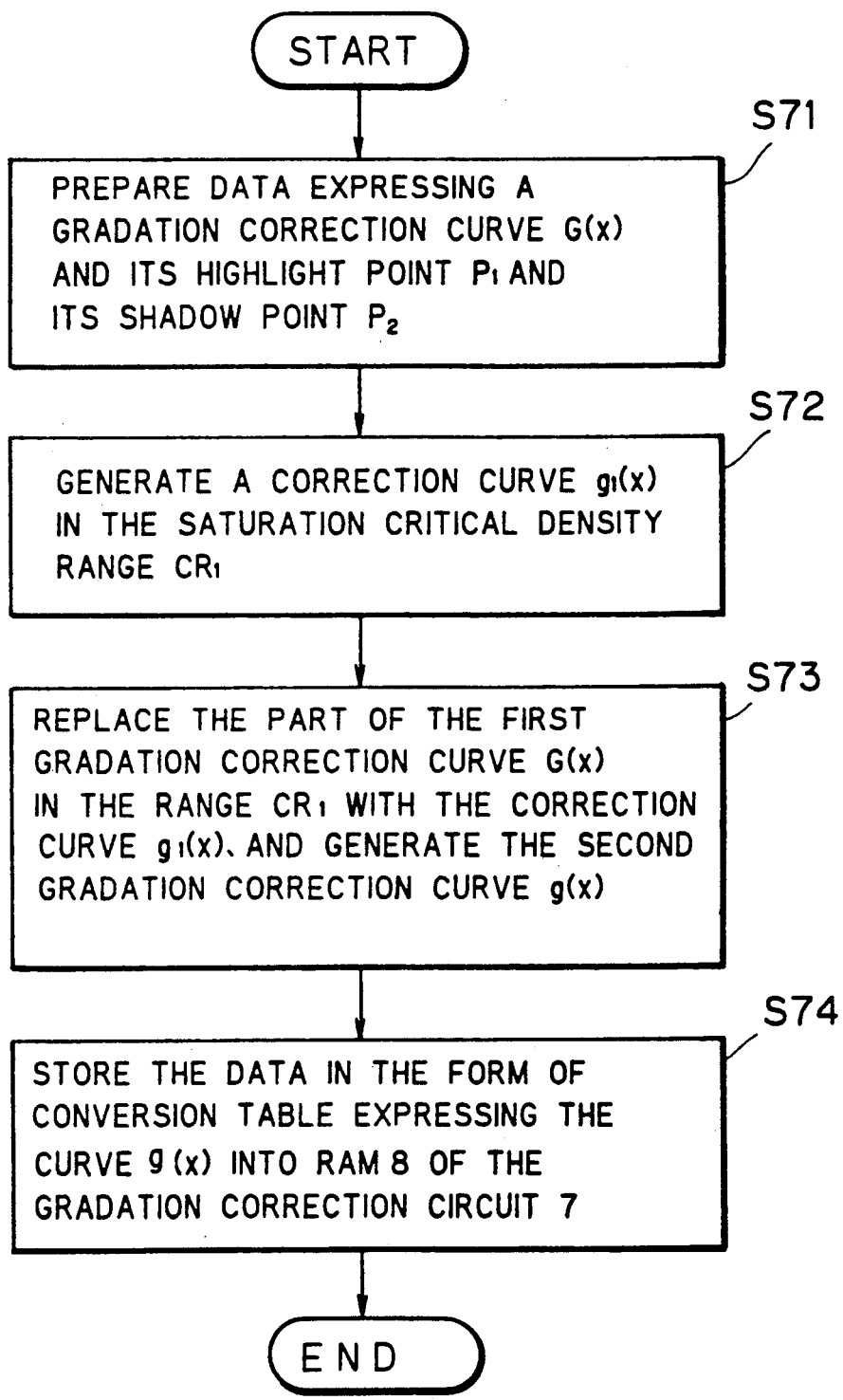
FIG. 13 is a flow chart showing a procedure of a first correction method according to an embodiment of the present invention.
Figure 14:
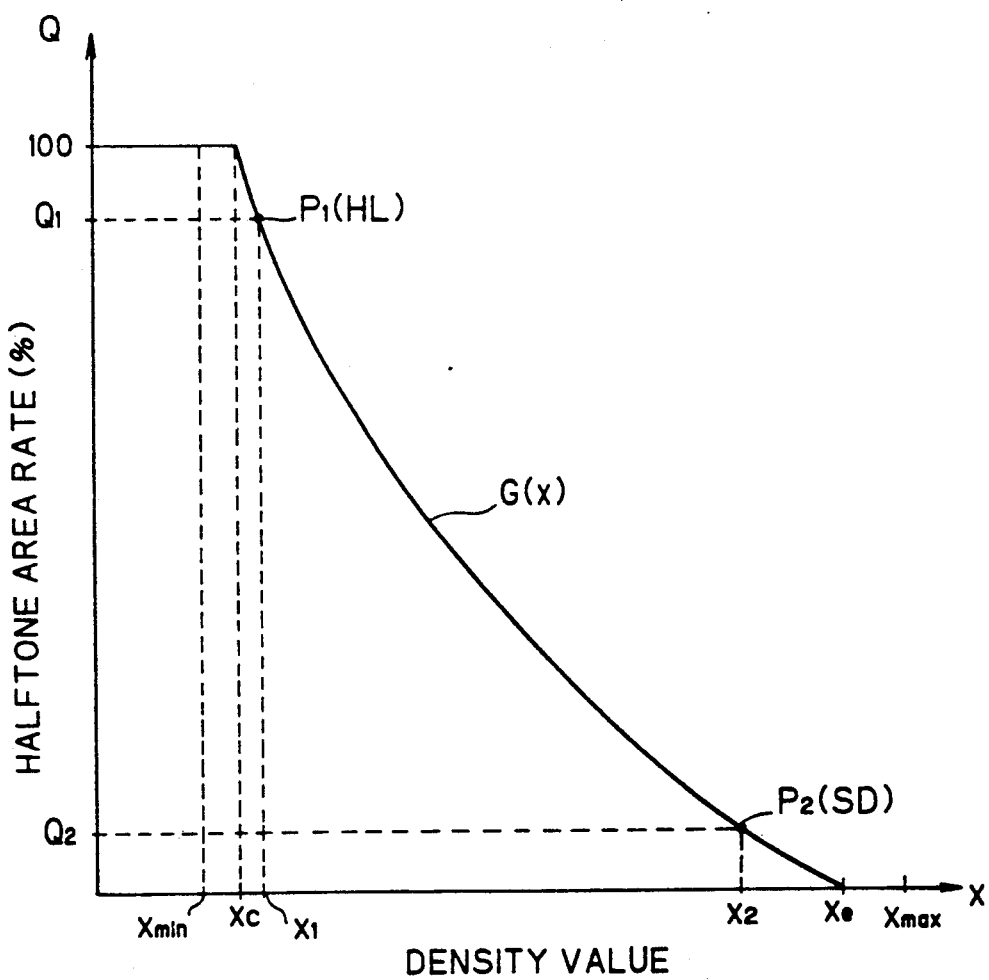
FIG. 14 is a diagram showing a gradation correction curve used for the first correction method.

FIG. 13 is a flow chart showing procedure of a first correction method according to an embodiment of the present invention. At a step S71, a first gradation correction curve G(x) shown in FIG. 14, which is obtained by the aforementioned first method, for example, is prepared and data expressing the same is stored in the memory 15.

Parameter values of a highlight point $P_1$ (HL):

$$P_1 = (x_1, Q_1) \tag{E-1}$$

and a shadow point $P_2$ (SD):

$$P_2 = (x_2, Q_2) \tag{E-2}$$

employed for obtaining the first gradation correction curve G(x) are also stored in the memory 15.

Figure 15:
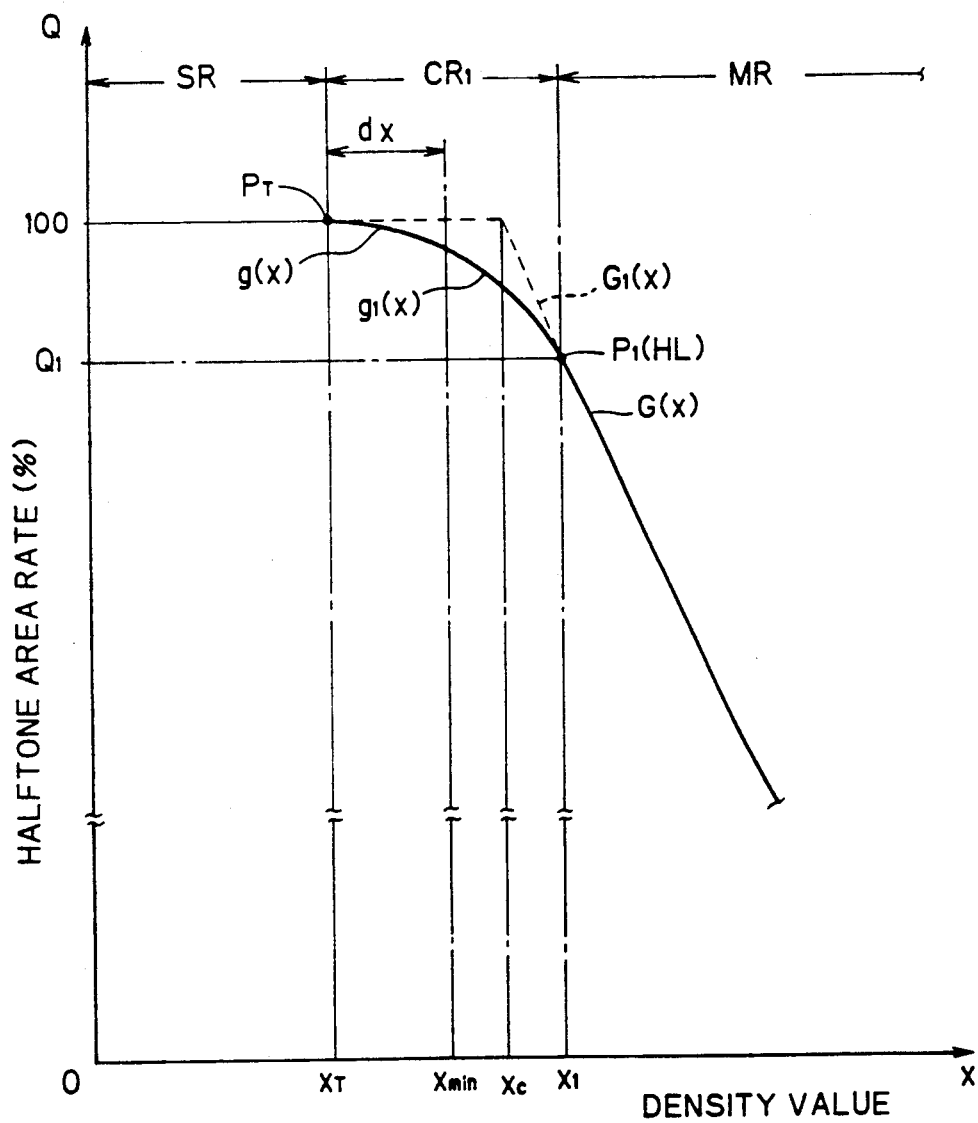
FIG. 15 is a diagram showing a highlight portion of the gradation correction curve shown in FIG. 14.

At a step S72, a correction curve $g_1(x)$ is obtained as follows:

FIG. 15 illustrates a highlight portion of the first gradation correction curve G(x). The curve G(x) is drawn by a broken line as a curve $G_1(x)$ within a range $CR_1$.

In general, a highlight point density value $x_1$ is not necessarily at the minimum density value $x_{min}$, and a shadow point density value $x_2$ is not necessarily at the maximum density value $x_{max}$. Therefore, as understood from aforementioned FIG. 5B, $$x_{min} \leq x_1 \leq x_2 \leq x_{max} \tag{E-3}$$

and the curve G(x) shown in FIG. 15 corresponds to the case of $x_{min} < x_1$.

A density value at which the first gradation correction curve G(x) reaches a 100% saturated value, i.e., a saturation critical density value $x_c$ (FIG. 15 is varied with positions of he highlight and shadow points $P_1$ and $P_2$, in addition to the configuration of the aforementioned standard gradation correction curve F(x) shown in FIG. 5C. However, it is recognized beforehand that the saturation critical density value $x_c$ is regularly within a range of:

$$0 \leq x_c \leq x_1 \tag{E-4}$$

According to this first correction method, on the other hand, a saturation critical density range (correction range) $CR_1$ including both of the saturation critical density value $x_c$ and the minimum density value generation limit density value $x_{min}$ is set, thereby to correct the first gradation correction curve G(x) within this range $CR_1$. In consideration of conditions of the expressions (E-3) and (E-4), therefore, the range $CR_1$ may be set to include the highlight point density value $x_1$ as one end and a density value $x_T$ which is lower by a prescribed small amount dx from the minimum density value $x_{min}$ as another end. The small amount dx, which may be zero, can be assumed to be a finite value in consideration of the fact that it may be desirable to reliably introduce halftone dots having certain degrees of halftone area rates with respect to the minimum density value $x_{min}$ depending on the type (such as commercial printing, newspaper etc. of the process object, in addition to such case that an error is caused in the value of the minimum density value $x_{min}$.

A density range higher in density than the saturation critical density range $CR_1$ in a middle-part side of the gradation conversion curve is hereinafter referred to as a "middle-side range MR" and a range lower in density than the range $CR_1$ is referred to as a "saturation range SR".

The correction curve $g_1(x)$ within the saturation critical density range $CR_1$ is decided to be loosely changed as compared with a portion $G_1(x)$ of the first gradation conversion curve G(x) which is present in this range $CR_1$, to be smoothly connected with the first gradation correction curve G(x) at the highlight point $P_1$ corresponding to a boundary between the same and the middle-side range MR, and to reach 100% at a point $P_T$. In order to obtain a correction curve $g_1(x)$ which satisfies soph conditions and is provided with further preferable characteristics in the example shown in FIG. 15, the following conditions are applied to the correction curve $g_1(x)$ according to this embodiment:

(I) Conditions for Continuity $$g_1(x_1) = Q_1 (= G_1(x_1)) \tag{E-5a}$$

$$g_1(x_T) = 100 (= G_1(x_T)) \tag{E-5b}$$

Under these conditions, the correction curve $g_1(x)$ is continuously connected with the first gradation correction curve $G(x)$ at both end points of the range $CR_1$, thereby to prevent gradation skip.

(II) Condition for Smooth Connection $$g_1'(x_1) = G'(x_1)$$

Under this condition, the correction curve $g_1(x)$ is smoothly connected with the first gradation correction curve $G(x)$ at the highlight point $P_1$, thereby to prevent "crimp" in the gradation correction curve after correction. Dashes (') represent density differentials.

(III) Condition for Monotonic Reduction $$g_1'(x) < 0 (x_T < x \leq x_1) \tag{E-7}$$

This corresponds to a gradation correction curve for negative reproduction becomes a right-downward curve.

(IV) Condition for Curvature Sign $$g_1''(x) < 0 (x_T \leq x \leq x_1) \tag{E-8}$$

This is such a condition that the correction curve $g_1(x)$ is upwardly convex within the range $CR_1$ and has no point of inflection. The point of inflection is so inhibited as to prevent the gradation correction curve from being flat within the range $CR_1$.

Through the aforementioned conditions (I) to (IV), such a first basic condition of the present invention that the correction curve $g_1(x)$ is more "smoothly changed" as compared with a portion $G_1(x)$ in the range $CR_1$ of the first gradation correction curve, for the following reason:

First, it is noted that the correction curve $g_1(x)$, which starts from the point $P_T$ shown in FIG. 15 under the continuity conditions (I), is right-downwardly directed in a range of $x_T < x$ under the condition (III) of monotonic reduction. Further, the correction curve $g_1(x)$ is changed while maintaining an upwardly projected configuration under the condition (IV) of curvature sign, to be smoothly connected with the first gradation correction curve $G(x)$ at the highlight point $P_1$.

On the other hand, the first gradation correction curve $G(x)$ maintains the value of $Q = 100\%$ in a range of $x_T \leq x \leq x_c$ and is changed from $Q = 100\%$ to $Q = Q_1$ in a range of $x_c \leq x \leq x_1$ which is relatively narrow as compared with the range $CR_1$. In view of the entire range $CR_1$, therefore, the correction curve $g_1(x)$ is more smoothly changed as compared with the first gradation correction curve $G(x)$.

Further, such a second basic condition of the present invention that the correction curve $g_1(x)$ is smoothly connected with the middle-side range MR of the first gradation correction curve $G(x)$ at the highlight point $P_1$ is guaranteed by the aforementioned (I) and (II).

A large number of correction curves $g_1(x)$ satisfying the conditions (I) to (IV) can be implemented through secondary or higher order polynominals. When a condition for the configuration is a curve of the second order (parabola) with respect to the density value x, for example, curves expressed as following expressions (E-9)~(E-11) are obtained as the correction curves $g_1(x)$:

$$g_1(x) = a(x - x_1)^2 + G'(x_1)(x - x_1) + G(x_1) \tag{E-9}$$

$$a = (x_T - x_1)^{-2} A \tag{E-10}$$

$$A = 100 - [G'(x_1)(x_T - x_1) + G'(x_1)] \tag{E-11}$$

It can be easily confirmed that the curves defined in the expressions (E-9) to (E-11) satisfy the conditions (I) and (II).

In order to satisfy the condition (IV), the following expression must hold:

$$2a < 0 \tag{E-12}$$

As understood from the example shown in FIG. 15, inclination of a line segment not shown) connecting the point $P_T$ with the highlight point $P_1$:

$$\{G(x_1) - 100\}/(x_1 - x_T) \tag{E-13}$$

is normally higher than inclination $G'(x)$ of the first gradation correction curve $G(x)$ at the highlight point $P_1$ (since the absolute value is small and the sign is negative). Therefore, $$\{G(x_1) - 100\}/(x_1 - x_T) > G'(x_1) \tag{E-14}$$

and this is transformed to obtain:

$$100 - \{G'(x_1)(x_T - x_1) + G(x_1)\} < 0 \tag{E-15}$$

From the expressions (E-15), (E-11) and (E-10), $$a < 0 \tag{E-16}$$

Thus, the expression (E-12) (i.e., the condition IV)) is also satisfied.

Further, the condition (III) is that for satisfying:

$$2a(x - x_1) + G'(x_1) < 0 \tag{E-17}$$

with $x_T \leq x \leq x_1$, and in the right end $x = x_1$ of the range $CR_1$ the left side of the expression (E-17) becomes:

$$G'(x_1) \tag{E-18}$$

which has a negative sign. Since the expression (E-17) is a function of monotonic increase as to the density value x, the left side of the expression (E-17) becomes negative with $x_T \leq x \leq x_1$, to satisfy the condition (III) (condition of the expression (E-17)).

In the case of positive process printing, the right side of the expression (E-5b) becomes zero and the signs of inequality in the expressions (E-7) and (E-8) are inverted.

After the correction curve $g_1(x)$ is thus obtained, a portion $G_1(x)$ within the saturation critical density range $CR_1$ is replaced with the correction curve $g_1(x)$, within the data expressing the first gradation correction curve $G(x)$ stored in the memory 15 at a step S73. Thus, the first gradation correction curve $G(x)$ is corrected to a second gradation correction curve $g(x)$ shown in FIG. 15. This curve $g(x)$ is identical to the gradation correction curve $G(x)$ in the saturation range SR and the middle-side range MR, but different in configuration from the first gradation correction curve $G(x)$ only in the saturation critical density range $CR_1$.

At a step S74, the second gradation correction curve $g(x)$ thus obtained is stored in the RAM 8 in the form of a conversion table expressing the same. The second gradation correction curve $g(x)$ is employed for gradation correction with respect to the original 1.

As understood from FIG. 15, the second gradation correction curve $g(x)$ is entirely loosely changed not only in the vicinity of the saturation critical density value $x_c$ but in the vicinity of the minimum density value $x_{min}$, thereby to entirely improve gradation reproducibility in the range CR. Such a desirable gradation correction curve can be obtained by relatively simple correction, properly for automatically generating the gradation correction curve.

Necessity for the aforementioned correction is relatively small in the vicinity of the shadow point since the first gradation correction curve $G(x)$ itself is considerably loosely changed, while the saturation critical density range may be set to include a critical saturation density value $x_c$ of the first gradation correction curve $G(x)$ shown in FIG. 4 to $Q=0\%$ and the maximum density value $x_{max}$, to perform correction similarly to the above.

Figure 16:
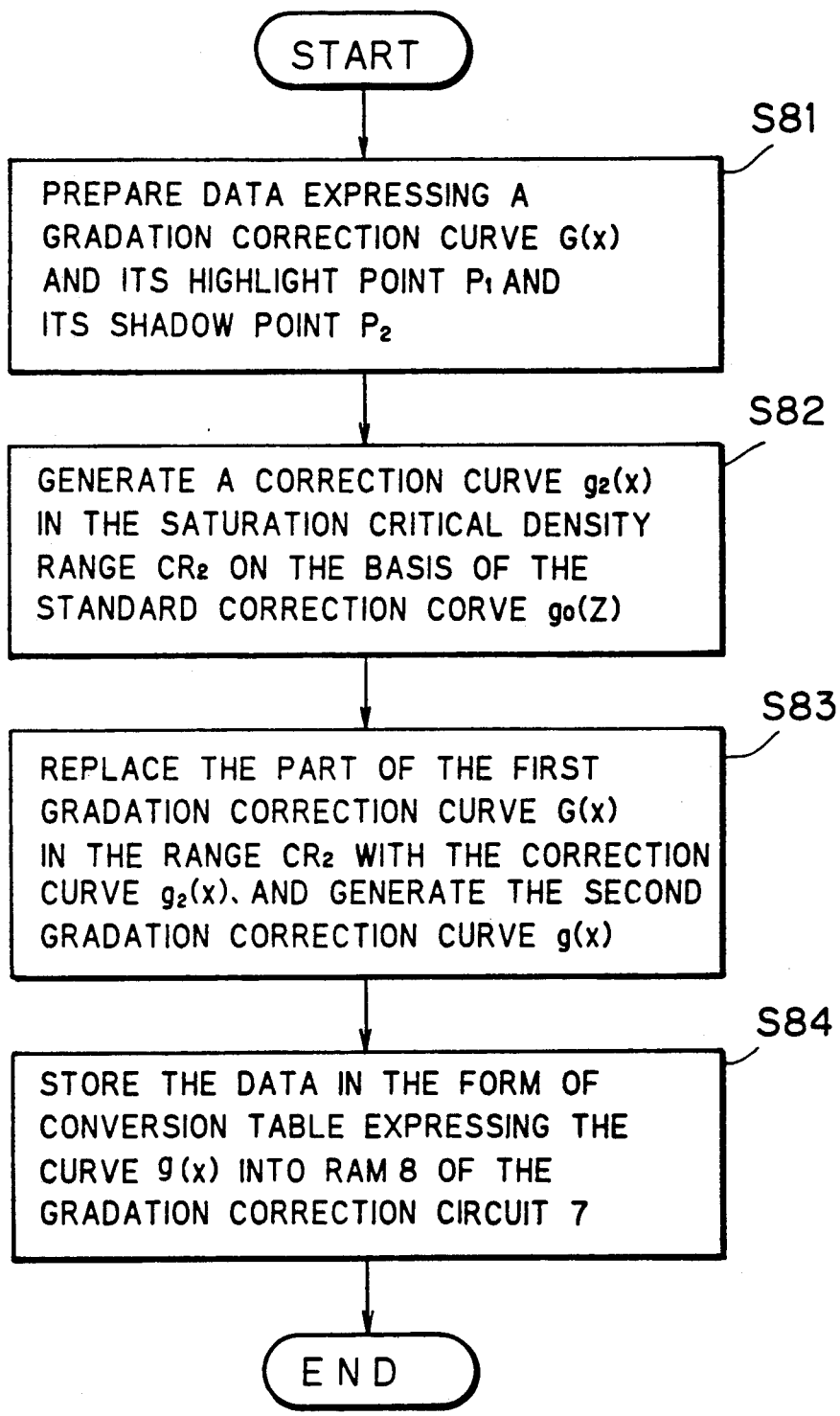
FIG. 16 is a flow chart showing a procedure of the second correction method according to an embodiment of the present invention.

A second correction method is now described. FIG. 16 is a flow chart showing procedure of the second correction method according to an embodiment of the present invention. At a step S81, a first gradation correction curve $G(x)$ is prepared similarly to the aforementioned first correction method, and data expressing the same is stored in the memory 15. However, there is no need to detect the minimum density value $x_{min}$ nd the maximum density value $x_{max}$.

Figure 17:
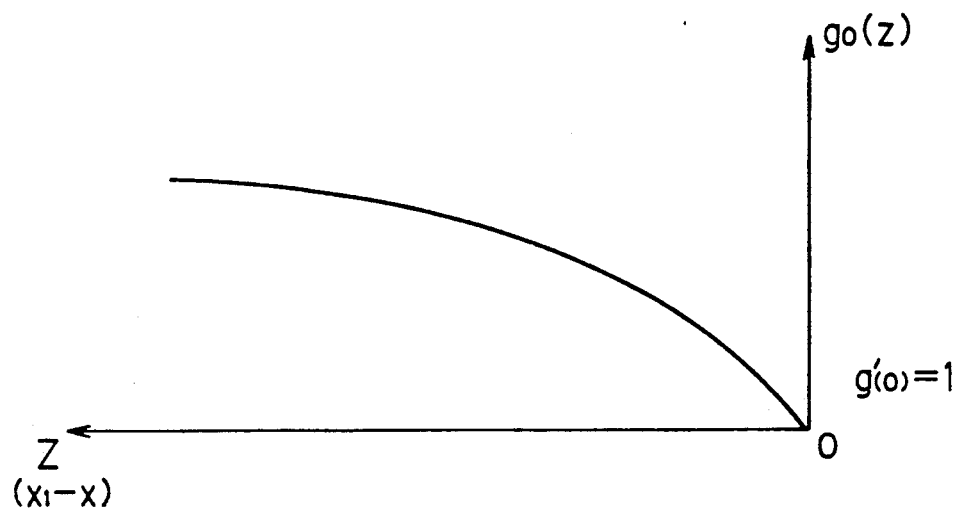
FIG. 17 is a diagram showing a standard correction curve used for the second correction method.

At a step S82, a standard correction curve $g_0(z)$ as illustrated in FIG. 17 is prepared. For the convenience of illustration, the horizontal axis is leftwardly directed. A density parameter z is described below. In this embodiment, conditions for the configuration of the correction curve $g_0(z)$ are: (1) this is a smooth function of monotonic increase; (2) this is upwardly projected; and (3) its value is "0" when $z=0$ and a differential coefficient is "1". An example of such a function is:

$$g_0(z) = \int_0^z 2^{-u} du \qquad (E\text{-}19)$$

Then, $$z = x_1 - x$$

is employed as the parameter z of the standard correction curve $g_0(z)$, to create the following correction curve:

$$g_2(x) = G(x_1) - G'(x_1) \cdot g_0(x_1 - x) \qquad (E\text{-}21)$$

The expression (E-21) is operated by making the function $g_0(x_1-x)$ into numerical table.

This correction curve $g_2(x)$ is defined within a range of:

$$0 \leq x \leq x_1 \qquad (E\text{-}22)$$

Figure 18:
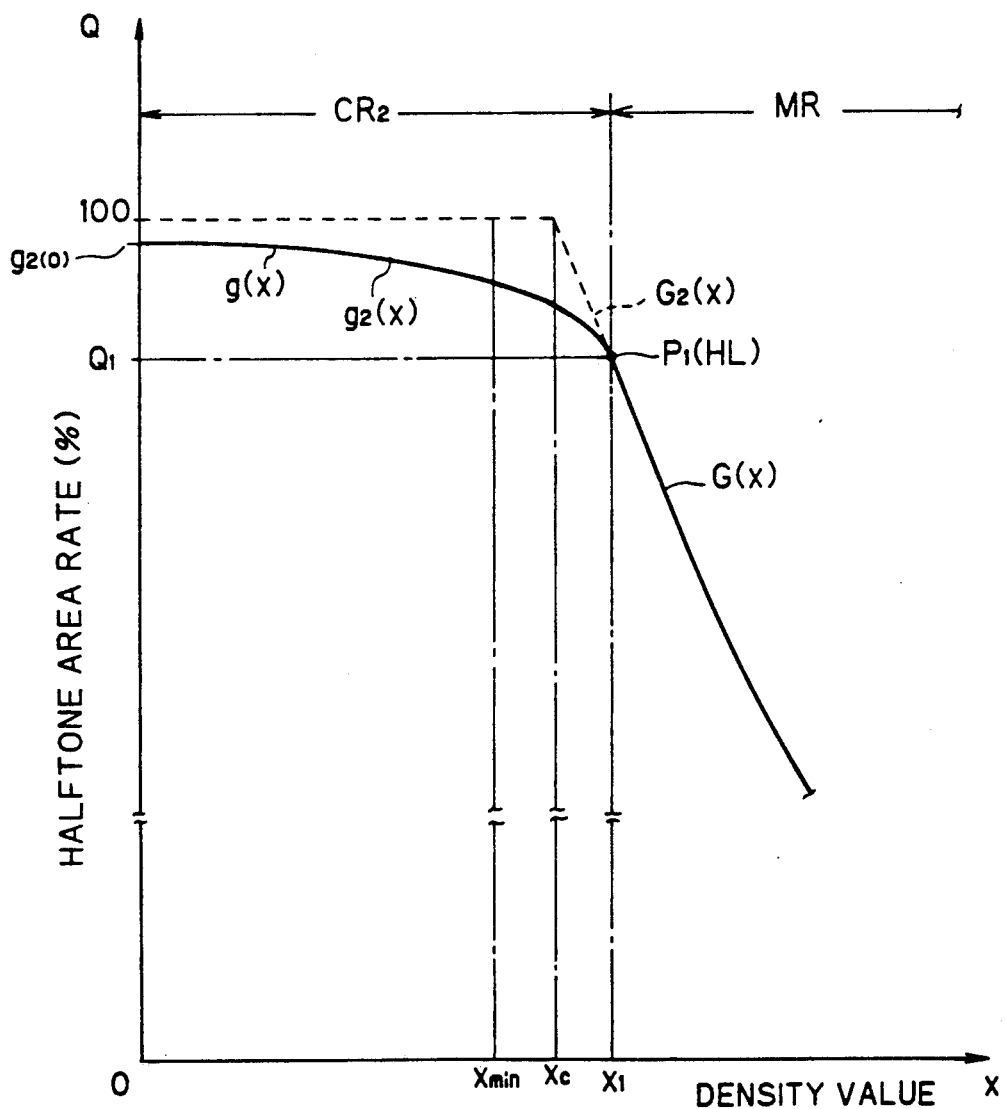
FIG. 18 is a diagram showing a highlight portion of the gradation correction curve used for the second correction method.

In other words, not the range $CR_1$ shown in FIG. 15 but a range $CR_2$ shown in FIG. 18 is set as a saturation critical density range to be corrected according to this second correction method. Since no minimum density value $x_{min}$ is obtained in the second correction method, no decision is made on the position of a lower density side end point of the range $CR_2$ based on the minimum density value $x_{min}$, but a range of:

$$x_L \leq x \leq x_1 \qquad (E\text{-}23)$$

is regarded as the critical density range $CR_2$ with respect to the aforementioned expression (E-13) or an arbitrary low density value $x_L$ ($<x_c$) (not shown).

Hence, it is understood that the configuration of the correction curve $g_2(x)$ corresponds to that obtained by overlapping FIGS. 17 and 18 so that the graph origin 0 of FIG. 17 coincides with a highlight point $P_1$ in FIG. 18 and multiplying the entire curve of FIG. 17 by a factor $(-G'(x_1))$.

At a step S83, a portion $G_2(x)$ in the saturation critical density range $CR_2$ of the first gradation correction curve $G(x)$ is replaced for correction by the correction curve $g_2(x)$ obtained through the expression (E-21), thereby to obtain a second gradation correction curve $g(x)$, as shown in FIG. 18.

The correction curve $g_2(x)$ obtained through the expression (E-21) satisfies the following two conditions:

$$g_2(x_1) = G(x_1) \qquad (E\text{-}24)$$

$$g_2'(x_1) = G'(x_1) < 0 \qquad (E\text{-}25)$$

by the expression (E-19), whereby the correction curve $g_2(x)$ is smoothly connected with the first gradation correction curve $G(x)$ in a middle-side density range MR. Further, as understood from the expression (E-19), $g_0(x_1-x)$ is relatively loosely and smoothly increased. Therefore, the correction curve $g_2(x)$ in the expression (E-21) is also loosely and smoothly increased in response to reduction in the density value x.

On the other hand, the first gradation correction curve $G(x)$ in a range of $x_c \leq x \leq x_1$ is relatively abruptly changed in proportion to a parameter $(x_1 - x)$ substantially as:

$$G(x) \approx G(x_1) - G'(x_1)(x_1 - x) \qquad (E\text{-}26)$$

and hence the aforementioned correction curve $g_2$ is more smoothly changed as compared with the first gradation correction curve $G(x)$.

In the second correction method, gradation reproducibility in an end portion side density range (saturation critical density range) $CR_2$ can be improved with no influence exerted by an error in the minimum density value $x_{min}$ caused by trimming of the original 1 or noise, since no minimum density value $x_{min}$ is used. Further, the processing is simplified since there is no need to detect the density value $x_{min}$.

At a step S84, the second gradation correction curve $g(x)$ is stored in the RAM 8 in the form of a conversion table and used.

Figure 19:
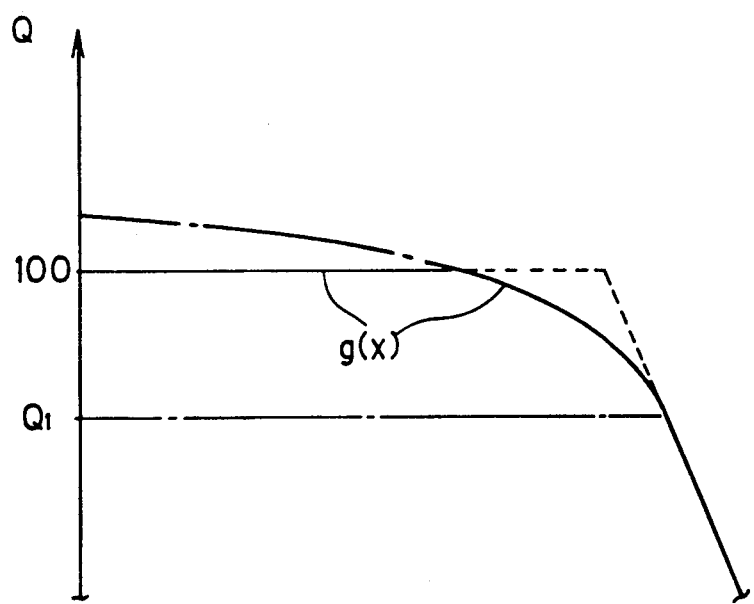
FIG. 19 is a diagram showing a saturated gradation correction curve used for the second correction method.

Although the value $g(0)$ of the second gradation correction curve $g(x)$ is not more than 100% when $x=0$ in FIG. 18, this value $g(0)$ is not necessarily less than 100% in general. In case of exceeding 100%, the same is saturated at 100% as shown in FIG. 19.

Correction similar to the above is possible also as to a shadow point, similarly to the first correction method.

Description is now made on modifications.

Various curves such as a Munsell curve and the like can be employed as the first gradation correction curve. In particular, the second correction method is more preferable in the case of setting a first gradation correction curve with no detection relating to density distribution of an original such as an accumulated density histogram, since there is no need to detect a generation limit density value in the second correction method.

Further, the manner of obtaining a correction function can be modified in various ways. For example, a method approximate to the second correction method can be obtained by employing not a value set by the minimum density value $x_{min}$ but a fixed value ($x_T=0$, for example) as a density value $x_T$ in the first correction method. On the other hand, the second correction method approximates to the first correction method when a function J(z) (not shown) further satisfying the following condition:

$$G(x_1) - G'(x_1)J(x_T - x_1) = 100 \qquad (E\text{-}27)$$

is used as the standard correction curve g(x) employed in the second correction method and the same value ($x_{min} - dx$) as that of the first correction method is employed as $x_T$.

That is, although the aforementioned first correction method is formed as that included in both of the first and second methods according to the present invention and the second correction method is formed as that specific to the first correction method, essential difference therebetween resides in whether or not the generation limit density value is detected and used.

F. Modifications

Description is now made on other modifications.

Figure 20:
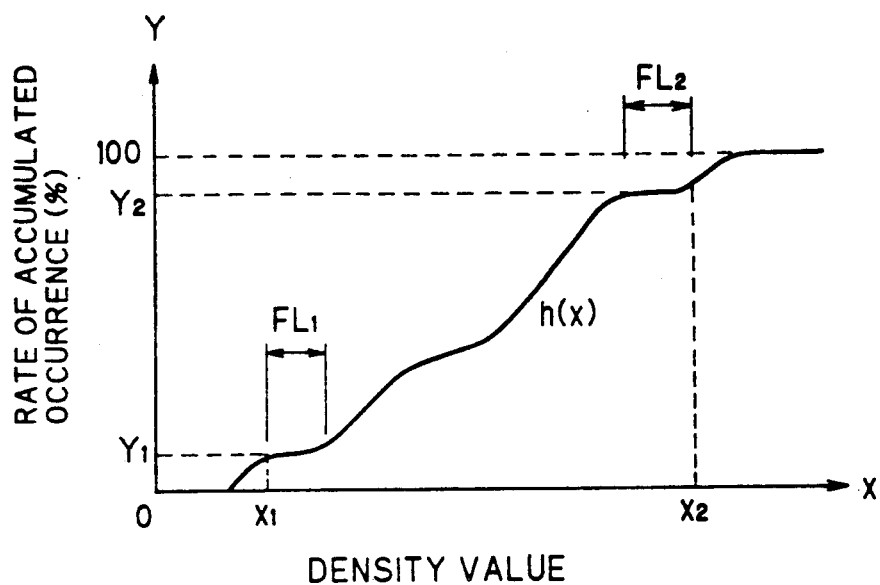
FIG. 20 is a diagram showing an accumulated density histogram with flat portions.

Although the highlight and shadow points are generally univocally set through the aforementioned steps respectively in the first and second methods, a highlight point density value $x_1$ and a shadow point density value $x_2$ are not univocally decided when flat portions $FL_1$ and $FL_2$ are present in an accumulated density histogram h(x), as shown in FIG. 20. In such case, a value most approximate to $x=0\%$ may be selected for the highlight point density value $x_1$ and a value most approximate to $x=100\%$ may be selected for the shadow point density value $x_2$, as shown in FIG. 20.

Figure 21:
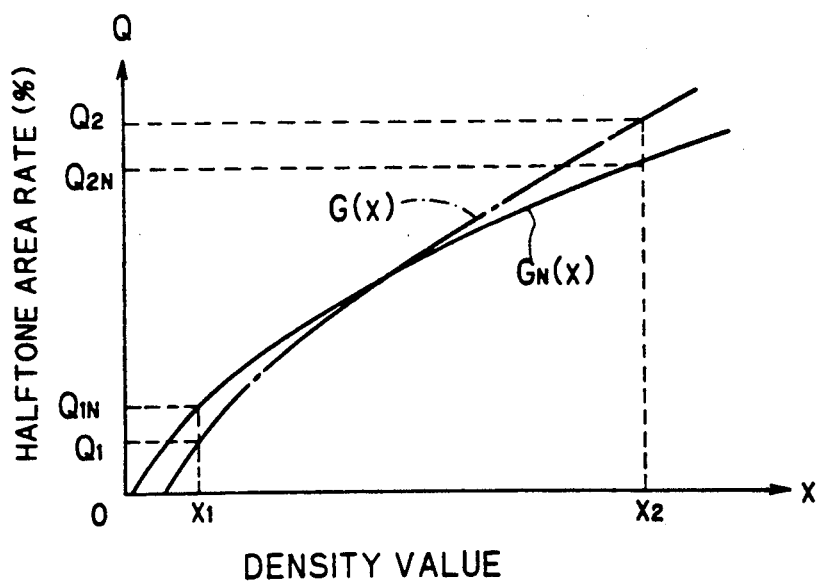
FIG. 21 is a diagram showing a smooth gradation correction curve.

As hereinabove described, the respective values $Y_1$, $Y_2$, $Q_1$ and $Q_2$ can be set for every type and application of the original and a smooth gradation correction curve $G_N(x)$ as shown in FIG. 21 can be obtained when the original is formed by a photograph for newspaper printing, for example. Referring to FIG. 21, a halftone area rate $Q_{1N}$ of highlight point and a halftone area rate $Q_{2N}$ of shadow point are those for newspaper, which are closer to a central portion of the vertical axis as compared with general halftone area rates $Q_1$ and $Q_2$.

The first and second methods according to the present invention can be applied not only to a process scanner but to a copying apparatus or a facsimile having gradation reproducibility. In this case, an empirical curve indicates relation between a rate of accumulated occurrence and an empirically obtained duplication density, and processing similar to the above may be performed on the basis of this empirical curve.

When image information as to the original I is temporarily stored in a mass storage memory, no prescanning is required for obtaining an accumulated density histogram but the image data may be read from the said memory to be used.

The third and fourth methods can also be applied not only to a process scanner but to a copying apparatus or a facsimile having gradation reproducinity. Further, gradation correction curves employed in these methods are not restricted to empirical curves, but may be those specified by an operator.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of producing a reproduced image from an original image the method including generating a gradation correction curve Q = G(x) and using the same in a gradation correction circuit for gradation correction of the original image on an x-Q plane, where x is a first variable representing optical densities and Q is a second variable representing corrected optical densities or halftone dot percentages corresponding to the corrected optical densities, said method comprising the steps of:
   (a) preparing a plurality of sample images adapted for the same type of application as said original image, and generating data signals representative of such sample images, and in response to said data signals:
   (b) obtaining a plurality of Y-Q curves on a Y-Q plane through which optical densities corresponding to Y-values are converted into Q-values in experimental gradation correction rules applied to said plurality of sample images, respectively, where Y is a third variable representing accumulated occurrence of optical densities,
   (c) finding coordinate values ($Y_r$, $Q_r$) representing a region on said Y-Q plane at which said plurality of Y-Q curves concentrate,
   (d) defining a reference Y-value and a reference Q-value by components $Y_r$ and $Q_r$ in said coordinate values ($Y_r$, $Q_r$), respectively,
   (e) generating data signals representative of said original image, and with a histogram counting circuit, obtaining an accumulated histogram Y = h(x) of optical densities with respect to said original image,
   (f) converting said reference Y-value $Y_r$ into a reference x-value $x_r$ through a curve expressing said accumulated histogram Y = h(x),
   (g) generating said gradation correction curve Q = G(x) on said x-Q plane so that said gradation correction curve Q = G(x) passes through a point having coordinate values ($x_r$, $Q_r$) thereon, and storing data representative of said gradation correction curve in a memory in said gradation correction circuit, and
   (g') producing said reproduced image at least in part on the basis of said gradation correction curve.

2. A method of claim 1, wherein the step (b) includes the steps of:
   (b-1) obtaining a plurality of experiential x-Q curves for said plurality of sample images, respectively,
   (b-2) obtaining a plurality of accumulated histograms representing relations between the variables x and Y in said plurality of sample images, respectively, and
   (b-3) combining said plurality of experiential x-Q curves with curves expressing said plurality of accumulated histograms to obtain said plurality of Y-Q curves, respectively.

3. A method of claim 2, wherein first and second areas are defined on said Y-Q plane, where said first area has Y-values smaller than Y-values in said second are, the step (c) includes the steps of:
- (c-1) finding first coordinate values ($Y_{r1}$, $Q_{r1}$) representing a first region which exists in said first area and at which said plurality of Y-Q curves concentrate, and
- (c-2) finding second coordinate values $Y_{r2}$, $Q_{r2}$) representing a second region which exists in said second area and at which said plurality of Y-Q curves concentrate, the step (d and (f) are conducted for each of said first and second coordinate values ($Y_{r1}$, $Q_{r1}$) and ($Y_{r2}$, $Q_{r2}$), whereby first and second reference x-values $x_{r1}$ and $x_{r2}$ are obtained, and said gradation curve $Q=G(x)$ is generated in the step (g) so as to pass through both of tow points which have coordinate values ($x_{r1}$, $Q_{r1}$) and ($x_{r2}$, $Q_{r2}$) on said x-Q plane, respectively.

4. A method of claim 3, wherein
the step (c) includes the steps of:
- (c-3) dividing each of said first and second areas into a plurality of cells, and
- (c-4) drawing said plurality of Y-Q curves on said Y-Q plane.

the steps (c-1) includes the steps of:
- (c-11) counting number of Y-Q curves passing through each cell belonging to said first area,
- (c-12) finding a first cell through which a maximum number of Y-Q curves are passing among said plurality of cells belonging to said first area and
- (c-13) finding coordinate values representing a position of said first cell on said Y-Q plane to obtain said first coordinate values ($Y_{r1}$, $Q_{r1}$), and the step (c-2) includes the steps of:
- (c-21) counting number of Y-Q curves passing through each cell belonging to said second area,
- (c-22) finding a second cell through which a maximum number of Y-Q curves are passing among said plurality of cells belonging to said second area and
- (c-23) finding coordinate values representing a position of said second cell on said Y-Q plane to obtain said second coordinate values ($Y_{r2}$, $Q_{r2}$).

5. A method of claim 4, further comprising the steps of:
- (h) determining lower and upper limit values of said third variable Y,
- (i) comparing said values $Y_{r1}$ and $Y_{r2}$ with said lower and upper limit values, respectively,
- (j) adding a first predetermined value $\delta_1$ to said value $Y_{r1}$ to obtain a first corrected value $Y_{r1c}$ when said value $Y_{r1}$ is equal to said lower limit value, and
- (k) subtracting a second predetermined value $\delta_2$ from said value $Y_{r2}$ to obtain a second corrected value $Y_{r2c}$ when said value $Y_{r2}$ is equal to said upper limit value, wherein the step (f) and (g) are conducted using said first and second corrected values $Y_{r1c}$ and $Y_{r2c}$ in place of said values $Y_{r1}$ and $Y_{r2}$, respectively.

6. A method of claim 5, wherein
the step (g) includes the steps of:
- (g-1) preparing a gradation correction curve $Q=F(x)$ whose shape is arbitrarily determined, and
- (g-2) correcting said gradation correction curve, $Q=F(x)$ so as to pass through said two points having said coordinate values ($x_{r1}$, $Q_{r1}$) and ($x_{r2}$, $Q_{r2}$), respectively, to thereby obtain said gradation curve $Q=G(x)$.

7. A method of producing a reproduced image from an original image the method including generating a gradation correction curve $Q=G(x)$ and using the same in a gradation correction circuit for gradation correction of the original image on an x-Q plane, where x is a first variable representing optical densities and Q is a second variable representing corrected optical densities or halftone dot percentages corresponding to the corrected optical densities,
- (a) generating data signals representative of said original image, an with a histogram counting circuit, obtaining an accumulated histogram $Y=h(x)$ of optical densities on said original image, where Y is a third variable representing accumulated occurrence of optical densities,
- (b) finding a critical x-value $x_m$ at which said accumulated histogram $Y=h(x)$ reaches a limit value of said third variable Y,
- (c) converting a given reference Y-value $Y_0$ to a reference x-value $x_0$ through a curve expressing said accumulated histogram $Y=h(x)$,
- (d) finding a degree of inclination of said curve expressing said accumulated histogram $Y=h(x)$ in a section between said critical x-value $x_m$ and said reference x-value $x_0$, to obtain a quantity expressing said degree of inclination,
- (e) converting said quantity to a Q-value according to a predetermined conversion rule which is obtained experimentally, to thereby obtain a reference Q-value $Q_0$,
- (f) generating said gradation correction curve $Q=G(x)$ so that said gradation correction curve $Q=G(x)$ passes through a point having coordinate values ($x_0$, $Q_0$) on an x-Q plane, and storing data representative of said gradation correction curve in a memory in said gradation correction circuit, and
- (g') producing said reproduced image at least in part on the basis of said gradation correction curve.

8. A method of claim 7, wherein
the step (d) includes the step of:
- (d-1) calculating a difference $\Delta x_0$ between said reference x-value $x_0$ and said critical x-value $x_m$, said difference $\Delta x_0$ being inversely proportional to said degree of inclination, said method further comprises the step of:
- (g) determining said conversion rule in the form of a conversion function $Q=f(\Delta x)$, where $\Delta x$ is a parameter representing a difference between said first variable x and said critical x-value $x_m$, and the step (e) includes the step of:
- (e-1) substituting $\Delta x = \Delta x_0$ into said conversion function $Q=f(\Delta x)$ to obtain said reference Q-value $Q_0$.

9. A method of claim 8, wherein
the step (g) includes the steps of:
- (g-1) preparing a plurality of sample images,
- (g-2) finding a plurality of accumulated histograms of optical densities with respect to said plurality of sample images, respectively,
- (g-3) converting a given Y-value $Y_A$ through A plurality of curves representing said plurality of accumulated histograms, to thereby obtain a plurality of x-values $\{x_A\}$
- (g-4) calculating respective differences $\{\Delta x_A\}$ between said plurality of x-values $\{\Delta x_A\}$ and said critical x-value $x_m$, (g-5) determining respective Q-values $\{Q_A\}$ to which said x-values $\{x_A\}$ are to be converted according to an experiential gradation corrected rule for said plurality of sample images, respectively.

(g-6) plotting a plurality of points having coordinate values $\{(\Delta x_A, Q_A)\}$ on a x-Q plane, (g-7) finding an approximate function approximately representing a line or curve on said $\Delta x$-Q plane along which said plurality of points distribute, and (g-8) defining said conversion function $Q=f(\Delta x)$ and said reference Y-value $Y_0$ by said approximate function and said given Y-value $Y_A$, respectively.

10. A method of claim 9, wherein
the step (g) further includes the steps of:

(g-9) calculating a correlation coefficient in distribution of said plurality of points from said line or curve expressing said approximate function on said $\Delta x$-Q plane, (g-10) repeating the steps (g-3) through (g-7) and (g-9) for a plurality of Y-values $\{Y_A\}$ different from each other, to thereby obtain a plurality of approximate functions and a plurality of correlation coefficients, and (g-11) comparing said plurality of correlation coefficients with each other to find a maximum correlation coefficient, and the step (g-8) includes the steps of:

(g-81) defining said conversion function $Q=f(\Delta x)$ by an approximate function which is selected from said plurality of approximate functions and has said maximum correlation coefficient, and (g-82) defining said reference Y-value $Y_o$ by a Y-value which is selected from said plurality of Y-values $\{Y_A\}$ and for which said maximum correlation coefficient is obtained.

11. A method of claim 10, wherein
The step (g-7) includes the step of:
applying a least square method to said distribution of said plurality of points, to thereby obtain a linear function as said approximate function.

12. A method of claim 11, further comprising the step of:

(h) repeating the steps (b) through (e) and (g) for a first critical x-value $x_{m1}$ at which said accumulated histogram $Y=h(x)$ rises from lower limit value of said variable Y and a second critical $x_{m2}$ at which said accumulated histogram $Y=h(x)$ reaches an upper limit value of said variable y while using different values for said plurality of Y-values $\{Y_A\}$ for each repetition, whereby two sets of coordinate values $(x_{01}, Q_{01})$ and $(x_{02}, Q_{02})$ are obtained, the steps (f) including the steps of:

(f-1) generating said gradation correction curve $Q=G(x)$ so that said gradation correction curve $Q=G(x)$ passes through two points having coordinate values $(x_{01}, Q_{01})$ and $(x_{02}, Q_{02})$, respectively.

13. A method of claim 12, wherein
the step (f-1) includes the steps of:

(f-11) preparing a gradation correction curve $Q=F(x)$ whose shape is arbitrarily determined, and (f-12) correcting said gradation correction curve, $Q=F(x)$ so as to pass through said two points having said coordinate values $(x_{01}, Q_{01})$ and $(x_{02}, Q_{02})$, respectively, to thereby obtain said gradation curve $Q=G(x)$.

14. A method of producing a reproduced image from an original image the method including generating a gradation correction curve $Q=G(x)$ and using the same in a gradation correction circuit for gradation correction of the original image, where x is a first variable representing optical densities and Q is a second variable representing corrected optical densities or halftone dot percentages corresponding to the corrected optical densities, said method comprising the steps of:

(a) detecting a density distribution on said original image to obtain a value $\Delta x$ representing a density range of said original image, (b) generating a model curve $Q=K(x)$ on an x-Q plane by determining a curvature of said model curve $Q=K(x)$ according to said value $\Delta x$, wherein a sign of said curvature of said model curve is variable depending on said density range of said original image, (c) correcting said model curve $Q=K(x)$ so as to pass through at least one point which is given on said x-Q plane, to generate said gradation correction curve $Q=G(x)$, and storing data representative of said gradation correction curve in a memory in said gradation correction circuit, and (c') producing said reproduced image at least in part on the basis of said gradation correction curve.

15. A method of claim 14, further comprising the steps of:

(d) preparing a plurality of reference curves $\{Q=F(x)\}$ whose curvatures are different from each other, (e) determining a conversion rule for converting a first parameter representing given density ranges into a second parameter representing composing rates reference curves, the steps (b) including the steps of:

(b-1) converting said value $\Delta x$ according to said conversion rule to obtain a composing rate $f(\Delta x)$ corresponding to said value $\Delta x$, and (b-2) composing said plurality of reference curves $\{Q=F(x)\}$ with each other at said composing rate $f(\Delta x)$ to thereby obtain said model curve $Q=K(x)$.

16. A method of claim 15, wherein
said plurality of reference curves $\{Q=F(x)\}$ has first and second reference curves $Q=F_a(x)$, $Q=F_b(x)$ which are selected from a group consisting of an upward convex curve, a downward convex curve, and a straight line defined on an oriented x-Q plane which is oriented so that an x-axis is a horizontal axis and a Q-axis is a vertical axis directed upwardly.

17. A method of claim 16, wherein
said conversion function is:
a first constant for values in a first section of said first parameter,
a second constant different form said first constant for values in a second section of said first parameter which is apart from said first section, and a non-constant function for values in a third section of said first parameter defined between said first and second sections.

18. A method of claim 17, wherein
the steps (a) includes the steps of:

(a-1) obtaining an accumulated histogram of optical densities on said original image to generate a curve $Y=h(x)$ representing said accumulated histogram, where Y is a third variable representing accumulated occurence of optical images, (a-2) converting given two Y-values by said curve $Y=h(x)$ to obtain two x-values corresponding to said given two Y-values, and (a-3) calculating a difference between said two x-values to obtain said value $\Delta x$.

19. A method of claim 18, wherein said gradation correction curve $Q=G(x)$ is generated for a positive reproduction of said original image, and said plurality of reference curves $\{Q=F(x)\}$ are composed with each other so that said gradation correction curve $Q=G(x)$ is:

a downward convex curve on said oriented x-Q plane when said value $\Delta x$ is smaller than a predetermined a critical value $\Delta x_C$, and an upward convex curve on said oriented x-Q plane when said value $\Delta x$ is larger than said critical value $\Delta x_C$.

20. A method of claim 18, wherein said gradation correction curve $Q=G(x)$ is generated for a negative reproduction of said original image, and said plurality of said reference curves $\{Q=F(x)\}$ are composed with each other so that said gradation correction curve $Q=G(x)$ is:

an upward convex curve on said oriented x-Q plane when said value $\Delta x$ is smaller than a predetermined critical value $\Delta x_C$, and a downward convex curve on said oriented x-Q plane when said value $\Delta x$ is larger than said critical value $\Delta x_C$.

21. A method of producing a reproduced image from an original image the method including generating a gradation correction curve $Q=G(x)$ and using the same in a gradation correction circuit for gradation correction of an original image, where x is a first variable representing optical densities and Q is a second variable representing corrected optical densities or halftone dot percentages corresponding to the corrected optical densities, said method comprising the steps of:

(a) generating a first gradation curve $Q=F(x)$ passing through designated highlight and shadow points on an x-Q plane which is oriented so that an x-axis is a horizontal axis and a Q-axis is a vertical axis being directed upward, (b) designating a saturation critical density range CR of said first variable x which includes a saturation critical density value $x_c$ at which said first gradation correction $Q=F(x)$ reaches a saturation value of said second variable Q, (c) generating a correction curve $Q=G_c(x)$ satisfying all of the following conditions (i) through (iii):

(i) said correction curve $Q=G_c(x)$ is defined in said saturation critical density range CR, (ii) said correction curve $Q=G_c(x)$ changes more gradually than said first gradation correction curve $Q=F(x)$ in said saturation critical density range CR, (iii) said correction curve $Q=G_c(x)$ is smoothly connectable to said first gradation correction curve $Q=F(x)$ at a terminal point of said saturation critical density range CR, (d) replacing a part of said first gradation correction curve $Q=F(x)$ located in said saturation critical density range CR by said correction curve $Q=G_c(x)$ in order to correct said first gradation correction curve $Q=F(x)$, whereby a second gradation correction curve serving as said gradation correction curve $Q=G(x)$ is generated, and storing data representative of said second gradation correction curve in a memory in said gradation correction circuit, and (d') producing said reproduced image at least in part on the basis of said gradation correction curve.

22. A method of claim 21, wherein the step (b) includes the steps of:

(b-1) finding a limit density value $x_m$ designating a limit of optical densities in said original image, and (b-2) designating said saturation critical density range CR so as to include both of said saturation critical density value $x_C$ and said limit density value $x_m$.

23. A method of claim 22, wherein the step (b-2) includes the step of:

(b-21) finding a value $x_T$ which is deviated from said limit density value $x_m$ by a predetermined deviation $\Delta x$, and (b-22) determining said saturation critical density range CR So that one of terminal points of said range CR has said value $x_T$, and the condition (iii) includes the condition that said correction curve $Q=G_c(x)$ is smoothly connectable to said first gradation correction curve $Q=F(x)$ at both terminal points of said range CR.

24. A method of claim 21, wherein the step (b) includes the step of:

(b-1) designating said saturation critical density range CR so that a first terminal point of said range CR is located at a limit point of said first variable x and a second terminal point of said range CR is located at a point other than said limit point of said first variable x, and said terminal point in said condition (iii) is said second terminal point.

25. A method of claim 21, wherein said terminal point said condition (iii) is one of said highlight and shadow points.

26. A method of claim 25, wherein said correction function $Q=G_c(x)$ has no inflection point in said saturation critical density range CR.

27. A method of claim 26, wherein said correction function $Q=G_c(x)$ is a polynomial function of said first variable x.

28. A method of claim 26, wherein said correction function $Q=G_c(x)$ is an integral of an exponential function of said first variable x.

* * * * *